United States Patent
Vamvas

(10) Patent No.: US 11,480,147 B2
(45) Date of Patent: Oct. 25, 2022

(54) ECCENTRICALLY ROTATING MASS TURBINE

(71) Applicant: Vassilios Vamvas, Bedford, MA (US)

(72) Inventor: Vassilios Vamvas, Bedford, MA (US)

( * ) Notice: Subject to any disclaimer, the term of this patent is extended or adjusted under 35 U.S.C. 154(b) by 0 days.

(21) Appl. No.: 17/169,412

(22) Filed: Feb. 6, 2021

(65) Prior Publication Data
US 2021/0285415 A1 Sep. 16, 2021

Related U.S. Application Data

(63) Continuation-in-part of application No. 16/689,075, filed on Nov. 19, 2019, now Pat. No. 10,947,951, which is a continuation-in-part of application No. 16/032,045, filed on Jul. 10, 2018, now Pat. No. 10,533,531, which is a continuation-in-part of application No. 15/193,104, filed on Jun. 26, 2016, now Pat. No. 10,060,408.

(60) Provisional application No. 63/016,991, filed on Apr. 29, 2020, provisional application No. 62/210,455, filed on Aug. 27, 2015, provisional application No. 62/185,627, filed on Jun. 28, 2015.

(51) Int. Cl.
| | |
|---|---|
| *F03B 13/22* | (2006.01) |
| *F03B 13/20* | (2006.01) |
| *F03G 7/08* | (2006.01) |
| *B63B 35/44* | (2006.01) |
| *H02S 10/10* | (2014.01) |
| *H02S 10/40* | (2014.01) |
| *H02K 7/18* | (2006.01) |

(52) U.S. Cl.
CPC .............. *F03B 13/22* (2013.01); *B63B 35/44* (2013.01); *F03B 13/20* (2013.01); *F03G 7/08* (2013.01); *H02K 7/1823* (2013.01); *H02S 10/10* (2014.12); *H02S 10/40* (2014.12); *B63B 2035/4453* (2013.01); *B63B 2035/4466* (2013.01); *F05B 2220/32* (2013.01); *F05B 2220/706* (2013.01); *F05B 2240/93* (2013.01); *F05B 2250/44* (2020.08)

(58) Field of Classification Search
CPC .......... F03B 13/22; F03B 13/20; H02S 10/10; H02S 10/40; B63B 35/44; B63B 2035/4453; B63B 2035/4466; F03G 7/08; H02K 7/1823; F05B 2240/93
See application file for complete search history.

(56) References Cited

U.S. PATENT DOCUMENTS

| | | | | |
|---|---|---|---|---|
| 3,231,749 A | * | 1/1966 | Hinck, III | ............ H02K 7/1853 290/53 |
| 4,266,143 A | * | 5/1981 | Ng | ........................ F03B 13/20 60/505 |
| 8,823,196 B1 | * | 9/2014 | Gehring | ............. F03B 13/1885 290/53 |

(Continued)

*Primary Examiner* — Sean Gugger

(57) ABSTRACT

A turbine comprises a shaft (20), a mass (10) eccentrically mounted for rotation about shaft (20), having its center of gravity at a distance from the shaft (20) and a motion base (15). Motion base (15) rigidly supports the shaft (20), and is configured for moving the shaft (20) in any direction of at least two degrees of movement freedom, except for heave. A floating vessel-turbine (120), encloses entirely the eccentrically rotating mass (10) and the motion base (15). The turbine converts ocean wave energy into useful energy, very efficiently.

10 Claims, 22 Drawing Sheets

(56) References Cited

U.S. PATENT DOCUMENTS

2009/0322080 A1* 12/2009 Ruiz Minguela ......... F03G 3/08
                                                      290/42
2018/0363621 A1* 12/2018 Alm ....................... B63B 35/44

* cited by examiner

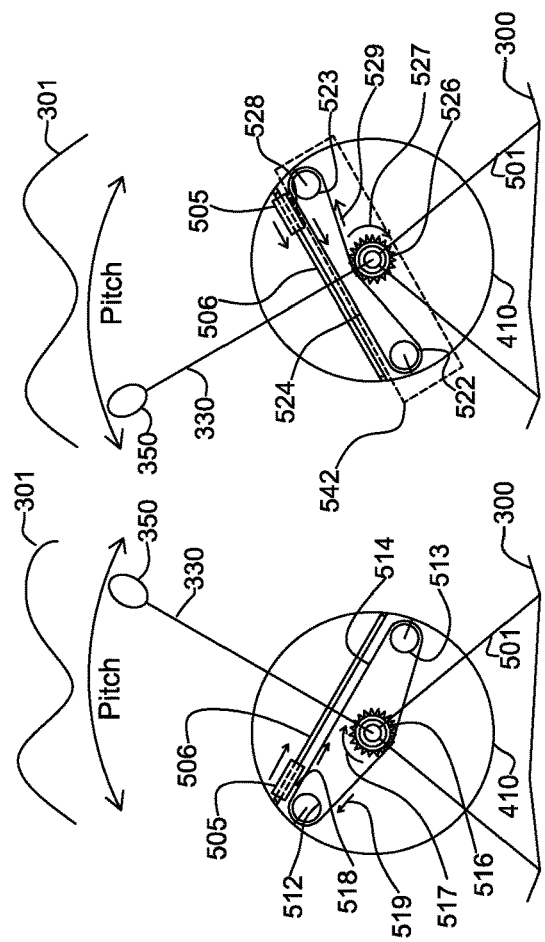
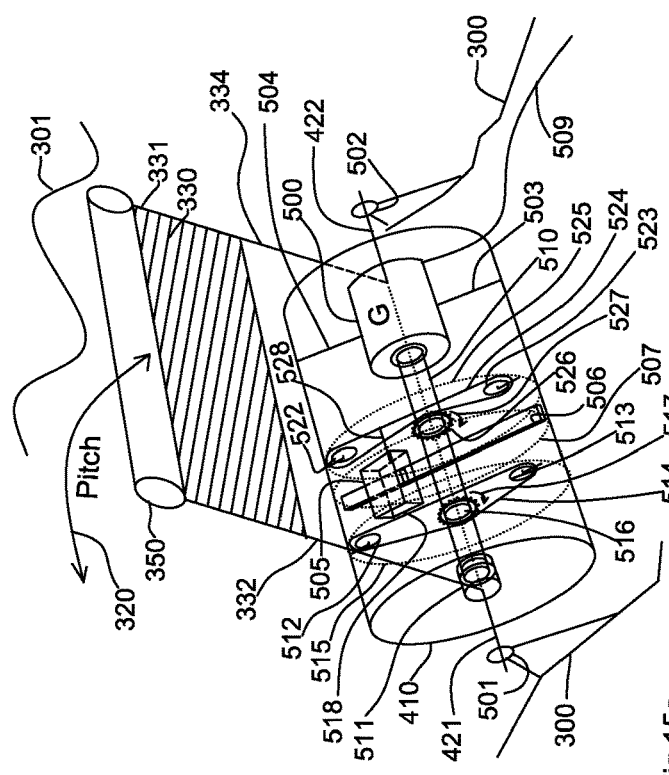

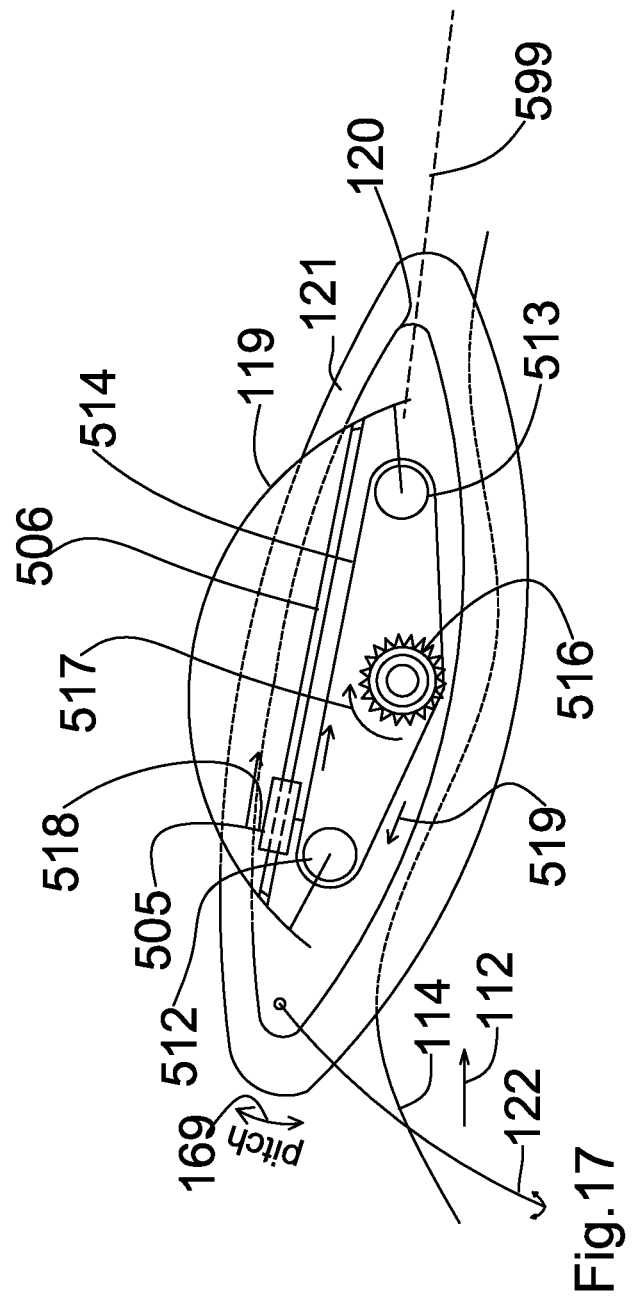

ECCENTRICALLY ROTATING MASS TURBINE

CROSS-REFERENCE TO RELATED APPLICATIONS

This application is a continuation-in-part of U.S. patent application Ser. No. 16/689,075 and claims the benefit of U.S. patent application Ser. No. 16/032,045 now U.S. patent Ser. No. 10,533,531, U.S. patent application Ser. No. 15/193,104 now U.S. patent Ser. No. 10,060,408, U.S. provisional patent application Ser. No. 63/016,991, U.S. provisional patent application Ser. No. 62/185,627 and U.S. provisional patent application Ser. No. 62/210,455 submitted by the same inventor and incorporated herein by reference in their entirety.

BACKGROUND

The following is a tabulation of some prior art that presently appears relevant:

U.S. Patents

| Patent Number | Kind Code | Issue Date | Patentee |
| --- | --- | --- | --- |
| 8,915,077 | B2 | 2014 Dec. 23 | Paakkinen |
| 8,887,501 | B2 | 2014 Nov. 18 | Paakkinen |
| 8,739,512 | B2 | 2014 Jun. 3 | Kanki |
| 8,614,521 | B2 | 2013 Dec. 24 | Babaritet al. |
| 8,456,026 | B2 | 2013 Jun. 4 | Cleveland |
| 8,269,365 | B2 | 2012 Sep. 18 | Clement et al. |
| 8,046,108 | B2 | 2011 Oct. 25 | Hench |
| 7,989,975 | B2 | 2011 Aug. 2 | Clement et al. |
| 7,934,773 | B2 | 2011 May 3 | Boulais et al. |
| 7,906,865 | B2 | 2011 Mar. 15 | Minguela et al |
| 7,484,460 | B2 | 2009 Feb. 3 | Blum et al. |
| 7,453,165 | B2 | 2008 Nov. 18 | Hench |
| 7,375,436 | B1 | 2008 May 20 | Goldin |
| 7,003,947 | B2 | 2006 Feb. 26 | Kanki |
| 6,888,262 | B2 | 2005 May 3 | Blakemore |
| 6,876,095 | B2 | 2005 Apr. 5 | Williams |
| 6,095,926 | | 2000 Aug. 1 | Hetterna et al. |
| 6,027,342 | | 2000 Feb. 22 | Brown |
| 4,843,250 | | 1989 Jun. 27 | Stupakis |
| 4,352,023 | | 1982 Sep. 28 | Sachs et al. |
| 4,266,143 | | 1981 May 5 | Ng |
| 3,577,655 | | 1971 May 4 | Pancoe |
| 3,231,749 | | 1966 Jan. 25 | Hinck |
| 937,712 | | 1909 Oct. 19 | McFarland |

| Patent Number | Kind Code | Issue Date | Applicant |
| --- | --- | --- | --- |
| U.S. Patent applications | | | |
| 2015/0123406 | A1 | 2015 May 7 | Paakkinen |
| 2012/0001432 | A1 | 2012 Jan. 5 | Clement et al. |
| 2011/0012443 | A1 | 2011 Jan. 20 | Powers |
| WO Patent applications | | | |
| WO2012103890 | A1 | 2012 Aug. 9 | Jan Olsen |
| WO2010034888 | A1 | 2010 Apr. 1 | Paakkinen |

FIELD OF USE

The present invention relates to turbines which convert a prime source of power to powerful rotation and more specifically to turbines which utilize gravitational and inertial forces applied on an eccentrically rotating mass.

DESCRIPTION OF THE PRIOR ART

In prior art, a rotator eccentrically mounted for rotation on an upright shaft and having its center of gravity at a distance from the shaft, has been used to produce electrical power utilizing ocean waves as a prime mover. Typically, a hollow floating structure, buoy or vessel provides the base where the upright shaft is supported. In most cases the rotating mass or pendulum having a weight attached at its distant end from the shaft is completely enclosed in the floating base for protection from the sea water. The waves rock the floating structure imparting the motion to the shaft, where the mass is mounted for rotation. The upright shaft moves from its position, forward and backward, or left and right or up and down in a linear or rotational direction causing the rotational displacement of the eccentrically rotating mass, which moves to a new position due to gravitational and inertial forces. Unfortunately, most of the times, the mass oscillates and only occasionally it rotates. Full rotations are difficult to succeed due to the randomness of the wave parameters. One wave may set the mass in rotation and the next may stop it, by generating rotation preventing forces. Devices, in prior art, aimed to avoid rotation preventing forces and "help" the mass into full rotations. U.S. Pat. No. 8,915,077 and patent application no. 2015/0123406 disclose floating structures of particular designs including a fixed upright shaft and a rotator. These structures have very specific designs and substantially large dimensions, in relation to the rotating mass. They are designed to produce beneficial inclinations and corresponding forces to "help" the rotator to rotate in full circles. However, the stochasticity of the wave train is still not avoided, rocking the vessel, stochastically, and relaying corresponding movement to the shaft. WO2010034888 and U.S. Pat. No. 7,375,436 describe devices that aim to "help" mass succeed full rotations, in different ways. They include gyroscopes, powered continuously to high rpm, in order to provide "the extra push" to the mass and bring it closer to a full rotation, through precession torque. This "gyroscopic push" constantly consumes power and its effect may still not be potent enough to overcome undesirable gravitational and/or electrical load based, rotation preventing forces.

U.S. Pat. No. 7,453,165 describes a device for harnessing the power of ocean waves through a buoy, which supports a pendulum mounted on a vertically oriented central shaft, fixed on the body of the buoy to directly receive its movements. Again, the buoy imparts all desirable and undesirable movements to the shaft.

The undesirable, or rotation preventing motion of a vessel occurs when an instant wave moves the vessel and inevitably the shaft, bringing it to a position that creates an "up-hill" for the rotating mass. Even worse it is when the wave arrives at a time that the mass is in rotational deceleration "running out" of a previously developed angular momentum.

The ideal condition for the mass rotation is to always have a "down-hill" ahead. It is an object of the present disclosure to generate "down-hill" conditions, most of the times.

The "down-hill" conditions occur when the shaft provides an inclination to the mass, which generates a beneficial for the rotation torque, due to gravity. This torque is maximum, when the lowest point of a "down-hill" is 90° ahead of the current position of the mass. Other forces, such as inertial forces, generated from the movement of the shaft in multiple translational or rotational directions, may also benefit the rotation.

U.S. Pat. No. 4,843,250 describes a buoyant vessel of a circular form with a pivot shaft of a lever arm having a weight at the end thereof. The weight is freely rotatable in either direction through 360 degrees. The lower end of the shaft is coupled to a piston type hydraulic pump, which draws fluid from a reservoir and activates a hydraulic motor to create electricity. U.S. Pat. No. 8,456,026 describes a gyroscopic device which can be used as a power generator utilizing natural wind or wave motion to induce processional rotation in a gyroscopic device. Processional rotation is also the object of U.S. Pat. Nos. 4,352,023, 7,003,947 and 7,375,436. U.S. Pat. No. 6,876,095 describes a generator which produces electrical power. The apparatus includes a main shaft with a weight element coupled to an end of the shaft. The weight is supported at a distance from the axis of the shaft to generate angular momentum upon movement of the end of the shaft on a cyclical arc path. This path belongs to one plane. A tangential force is applied to the shaft generated by a motor. The shaft is restricted to rotate only in one plane and about only one axis, being limited in contributing additional forces, during a full rotation, that would make the weight's rotation more powerful and substantially increase its power generation capability.

A floating vessel, disposed to ocean wave activity, can move in up to six degrees of movement freedom. These are three translations, forward/backward (surge or Translation on the x-axis: $T_x$), left/right (sway or Translation on the y-axis: $T_y$), up/down (heave or Translation on z-axis: $T_z$), and three rotations, pitch (rotation about the forward/backward axis: $R_x$), roll (rotation about the left/right axis: $R_y$) and yaw (rotation about the up and down axis: $R_z$).

Flight simulators or amusement ride capsules supported by motion bases can move in up to six degrees of freedom, as well. It is known in the art, that motion bases can be classified according to whether the motion can be carried out by independent motion producing stages, stacked upon each other, called "stacked" motion bases, or by a single platform, supported on a plurality of actuators, rams, or "legs", utilizing the principles of parallel kinematics, called "synergistic" motion bases.

The independent motion stages in a "stacked" motion base can be implemented by stacking simple machines such as linear slides, pivots and swivels, which are activated independently, by a corresponding actuator. A linear slide, for example, may include a base, straight-line bearings on the base, a platform that moves in a straight line along the bearings and actuators such as hydraulic cylinders or sprocket and chain, which when activated can provide a translational motion to a body attached on its platform. Similarly, a pivoting platform can provide a rotational motion.

The synergistic motion base consists of a part securely fixed and a part that can be linearly moved, through a limited distance or rotated through a limited angle. The movement of the one part of the base relative to the other is usually produced by extensible actuators or rams.

A motion base is also classified according to the number of degrees of movement freedom, or simply degrees of freedom, or the directions in which it can move. The Stewart platform, well known in the art, is a synergistic motion base which can provide six degrees of freedom.

Actuators include hydraulic rams, electrical actuators, such as rotary electric motors without or with a gearing system, which can impart high torque etc. Recently developed actuators include efficient pneumatic rams and electromagnetic rams, a form of dual action linear motor in which a piston moves freely in a cylinder like a hydraulic cylinder.

U.S. Pat. No. 7,484,460 claims a decouplable, movable track section of an amusement ride path and "a motion base supporting the movable track section and the motion base being configured for moving the movable track section in a direction along any of three coordinate axes, or any combination thereof, while also being configured for carrying out pitch, roll and yaw motions with the movable track section when the movable track section is decoupled."

SUMMARY

A turbine comprises a shaft being vertical in non-operative position, a mass eccentrically mounted for rotation about and in a perpendicular plane to the shaft, having its center of gravity at a distance of the shaft and a motion base rigidly supporting the shaft, being configured for moving the shaft in any of the directions of at least one set of two degrees of movement freedom, selected from the following degrees of movement freedom: pitch, roll, yaw, surge and sway.

The turbine provides with embodiments functional both in land and ocean. Prime movers such as actuators or even a prime source itself, such as ocean waves, provide with motion which activates a "stacked" or a "synergistic" motion base. A control system optimizes motion base's movements for the creation of beneficial gravitational and/or inertial forces to the eccentrically rotating mass.

LIST OF FIGURES

FIG. 15a shows a reciprocating mass operation in a submerged cylindrical buoy.

FIG. 15b shows a partial side view of one instant of a submerged buoy operation.

FIG. 15c shows a side view of an instant of a reciprocating mass in a submerged buoy.

FIG. 17 shows a reciprocating mass embodiment on a floating vessel.

DETAILED DESCRIPTION

Figure 1:
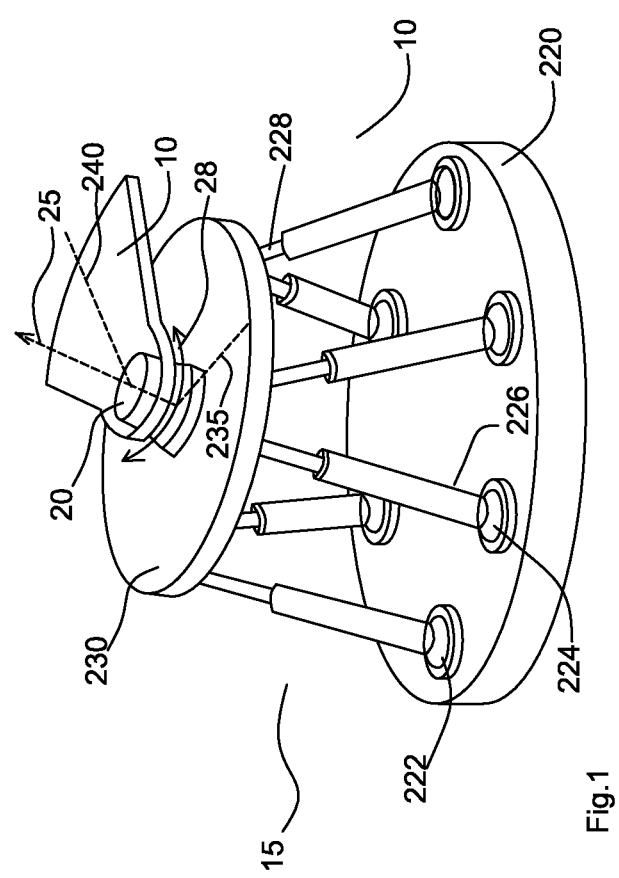
FIG. 1 shows a perspective view of a preferred embodiment of the turbine utilizing the eccentrically rotating mass at an instant of a beneficial inclination.

The present disclosure describes a turbine, utilizing a mass, eccentrically mounted for rotation, about a shaft in a perpendicular to shaft's main axis, plane. The mass has its center of gravity at a distance from the shaft. The mass rotation is facilitated with the use of bearings. The shaft, in one preferred embodiment, has a vertical non-operative position and issupported rigidly, not to rotate, on a moving platform of a motion base. In operation, the motion base provides to the shaft translational and/or rotational movements at a limited range of motion, causing the shaft to deviate from its initial vertical position. In another, preferred, embodiment the shaft is supported by a pivoting platform supported by a pivot, providing pivoting to the pivoting platform about a horizontal axis. The pivot is fixed on a second platform which limits the pivoting range of the pivoting platform to a small angle. The second platform is a motion base of the "synergistic" or "stacked" type. Shaft's deviation from the vertical position generates gravitational forces on the mass, which cause its rotation. Also, acceleration, deceleration and stopping of the shaft, generates inertial forces. The turbine disclosed can utilize both gravitational and inertial forces to have its mass rotate.

The turbine described, herein, can be used in land or offshore on a dedicated vessel or other ships, near-shore under the surface of the water or on shore, with great efficiencies. A control system with sensors may also be included to optimize the mass' angular momentum, by controlling the gravitational and/or inertial forces provided by the shaft to the mass. In ocean applications the control system, in addition, monitors the characteristics of the current wave, and if needed, the upcoming wave's as well, by having sensors disposed on the ocean surface, in proximity to the vessel-turbine. The control system monitors the mass' rotational parameters, such as angular velocity and momentum as well as the current and/or the upcoming wave characteristics, such as height, period and speed. It also monitors the upcoming possible shaft position, such as elevation, angle, rotational or translational speed or acceleration depending on the characteristics of the monitored waves. The load of turbine from compressor applications or electrical generation, is also monitored. The ocean control system compensates undesirable upcoming "up-hills" and creates the conditions for "down-hills" instead, by moving the shaft's position, accordingly.

Multiple controlled movements of the shaft can benefit the mass' rotation. However, at minimum, the movement of the shaft in the directions of at least two degrees of freedom can generate sufficient forces to the shaft for a powerful mass rotation, substantially more beneficial from the mass rotation that would have been derived by providing forces to move the shaft in the directions of only one degree of freedom. For example, it is more beneficial to surge and roll the shaft, within the same cycle, instead of only applying one of the two rotations. Similarly, it is more beneficial to provide pitch and roll or surge and pitch to the shaft, instead of only one movement from the pair of movements, mentioned, per cycle. Movements in the directions of heave would require substantial inclinations of the shaft to be beneficial, and is not being examined in the present disclosure. Below, the beneficial combinations by two are examined:

1) All combinations, by two, of $R_x$, $R_y$, $R_z$. Pitch and Roll can create "down-hills" which "help" the rotating mass' angular momentum. When a "down-hill" travel of the mass is over, the "difficulty of an up-hill", for the rotation, may begin. Yaw rotational motion applied to the mass can provide the additional "push", to add to the mass' angular momentum and "help" it overcome this "difficulty".

2) $T_x$-$R_y$, $T_y$-$R_x$, $T_x$-$R_x$, $T_y$-$R_y$. Similarly, to the above, Surge can fortify the rotating mass to overcome an "up-hill" created by Roll and Sway can "help" overcome an "up-hill" created from Pitch. Similarly, Surge and Pitch provide more angular momentum, through inertial and gravitational forces, in comparison to applying only one them. The same holds for Sway and Roll.

3) All combinations of $T_x$, $T_y$, $R_z$. Surge and Sway can maintain a powerful angular momentum of a mass through inertial forces, without necessarily needing a "down-hill" benefit. Of course, a "down-hill" benefit can be added to them as an extra "help", but this is the "at least two" list! Similarly, Yaw, applied in combination with Surge or Sway, adds an additional benefit to the mass rotation.

Overall the beneficial combinations are as follows: pitch-roll, pitch-yaw, roll-yaw, surge-roll, sway-pitch, surge-pitch, sway-roll, surge-sway, surge-yaw, sway-yaw. These, though, are all the possible combinations by two, from all beneficial degrees of movement freedom.

Referring now to the drawings in which like reference numerals are used to indicate the same related elements, FIG. 1 shows a preferred embodiment of the turbine. It shows an eccentric mass 10, mounted for rotation, indicated by arrows 28. Mass 10 is freely rotatable in either direction through 360 degrees about shaft 20 and its main axis 25. The rotation is facilitated by bearings (not shown). The rotational plane of mass 10, about shaft 20, is perpendicular to shaft's main axis 25. The center of gravity of mass 10 is at a distance from shaft 20.

Shaft 20 receives motion from motion base 15. Motion base 15 includes a shaft support 230, for supporting shaft 20, a fixed base 220 and actuators, such as 226 and 228. The actuators connect the underside of shaft support 230 (not shown) to fixed base 220 and impart movement to shaft 20. The actuators, such as 226 and 228 are connected via spherical bearings such as 222 and 224, or equivalent structures such as multiple axis bearing assemblies, universal joints, ball joints, among others. These actuators drive motion base 15, synergistically, thus providing the desirable movement to shaft 20, which sets eccentric mass 10 in rotation.

FIG. 1 illustrates the instant at which the shaft support is creating a "down-hill" for mass 10. The lowest point of the inclination is indicated by radius 235, while mass 10's position is indicated by radius 240. Mass 10 will rotate "down-hill", from this beneficial position, with a maximum torque, which is generated by the gravitational forces exerted on mass 10, at this instant.

Control means (not shown), such as a programmable logic controller with sensors, monitors the dynamics of rotation of eccentric mass 10, which is slowed down by the load of the turbine, which resists rotation, such as compressor applications or electricity production (not shown). The control means provides feedback to motion base 15, which imparts optimized movements and inclinations to shaft 20 in order to have optimized forces applied on mass 10 and overcome the resistive forces of the load. At least two degrees of freedom, as mentioned above, can provide with powerful rotations.

Figure 2:
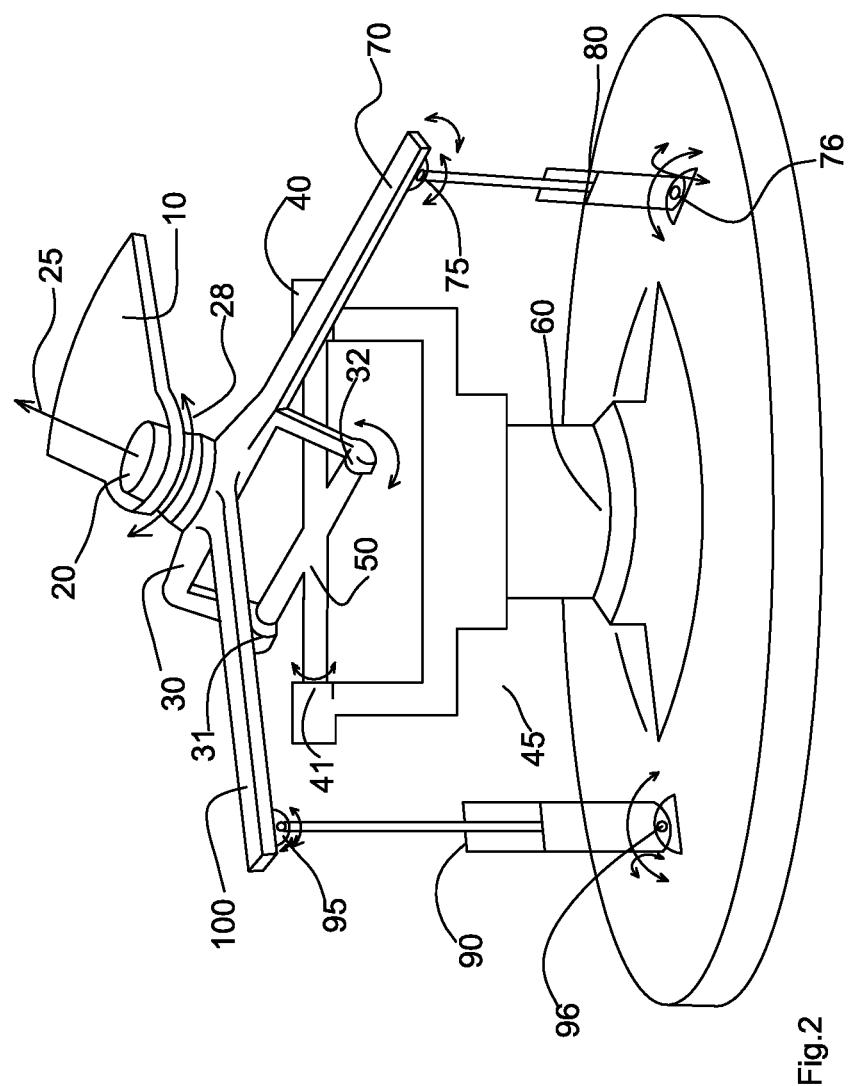
FIG. 2 shows a perspective view of a preferred embodiment of the turbine utilizing a vertical u-joint motion base.

FIG. 2 illustrates a preferred embodiment of the invention wherein motion base is the vertically oriented universal joint structure 45, which includes universal pivoting shaft support 30 and fixed pivot base 60 which are connected to each other with universal joint means, including pivoting cross 50, and actuators 80 and 90.

Universal pivoting shaft support 30 supports shaft 20. Cross 50 pivots about fixed pivot base 60 in points 40 and 41. Cross 50 also allows pivoting of universal pivoting shaft support 30 in points 31 and 32. Actuators 80 and 90 connect universal pivoting shaft support 30's extensions 70 and 100, to fixed pivot base 60, for imparting movement to universal pivoting shaft support 30 and shaft 20. Actuators 80 and 90 are connected via universal joints, 75, 76 and 95, 96, or equivalent structures such as multiple axis bearing assemblies, spherical joints, ball joints, among others.

This preferred embodiment provides movement to universal pivoting shaft support 30 in pitch and roll directions in relation to fixed pivot base 60. These rotational movements of universal pivoting support platform 30 provide universal inclinations to shaft 20, thus generating gravitational and inertial forces to mass 10, which can develop high angular velocity and momentum, thus providing powerful rotations.

Preferred embodiments of the turbine disclosed, such as the ones shown in FIG. 1 and FIG. 2 can be used in ocean applications, as well, being secured on a floating vessel, totally enclosed for protection from the sea water.

Figure 3:
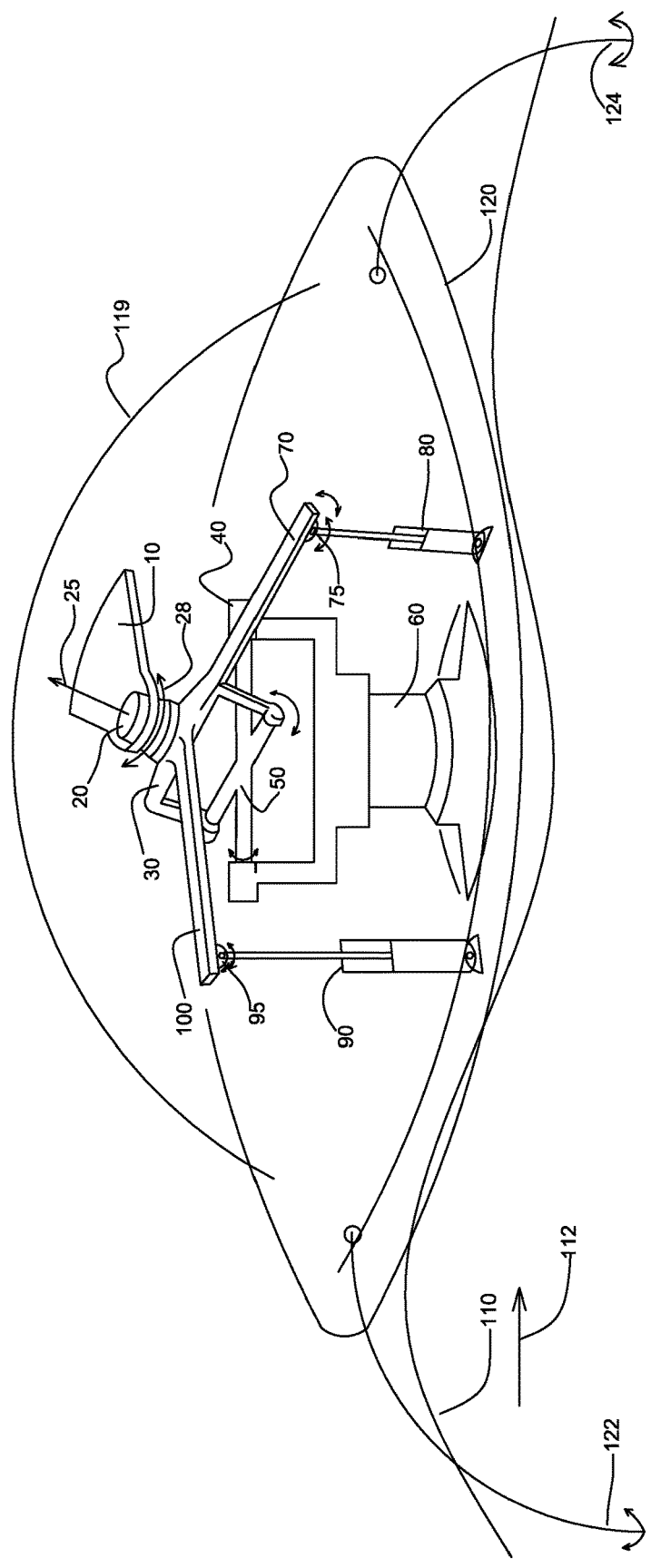
FIG. 3 shows a perspective view of a preferred embodiment of the turbine in the ocean protected from harsh conditions in a vessel.

FIG. 3 shows a preferred embodiment of the turbine operating in the ocean. It utilizes the vertically oriented universal joint structure 120, shown in FIG. 2, completely enclosed in floating vessel 120, by vessel's roof 121. Vessel 120 is disposed in ocean waves 110, which move in the direction indicated by arrow 112. The waves move vessel 20, which moves shaft 20. As a result, shaft 20 is forced to incline and mass 10 starts rotating. When an "up-hill" for mass 10 is about to occur, actuators 80 and 90, provide with an inclination, at any plane, favorable to mass 10's rotation. Another preferred embodiment uses, in addition, mooring means, such as anchors 122 and 124. Furthermore, in another preferred embodiment, control means (not shown), including sensors for predicting the parameters of the upcoming waves, disposed around vessel 120, provide feedback for optimized mass 10's rotation. Other preferred embodiments may include different shapes of vessels.

Figure 4:
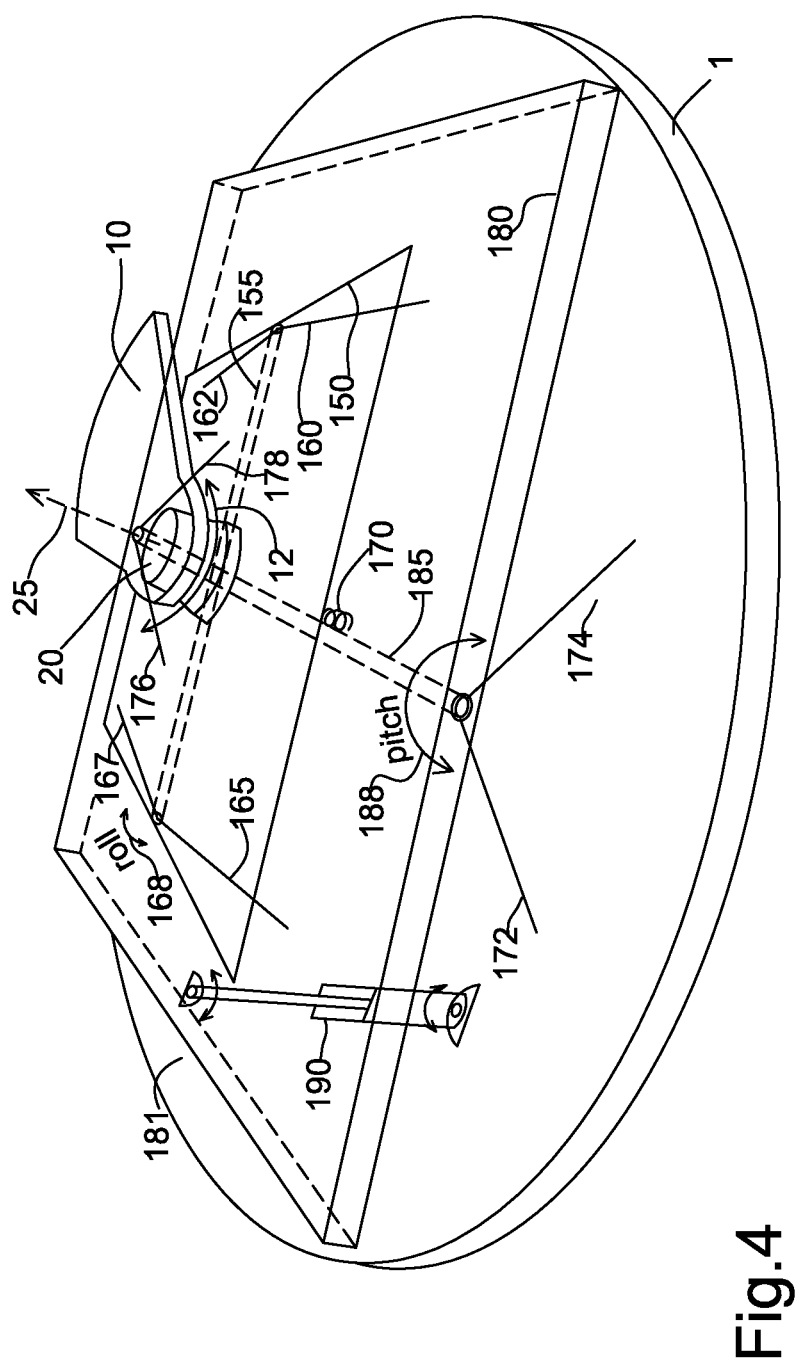
FIG. 4 shows a perspective view of a preferred embodiment of the turbine utilizing a pivoting support for the eccentrically rotating mass.

FIG. 4 illustrates another preferred embodiment of the turbine comprising pivoting platform 150, pivoting on horizontal pivot shaft 155, which is supported with pivot supports 160, 162, 165 and 167 on motion base 181. Pivoting platform 150 supports shaft 20 and eccentric mass 10. Shaft 20's main axis 25, crosses horizontal pivot shaft 155.

Motion base 181 is a one-stage motion base providing pivoting to pivoting platform 150. The position of pivoting platform 150, which supports shaft 20, depends only partially on the movement of motion base 181. That is, motion base 181 does not fully control shaft's 20 position as it was the case in the previous preferred embodiments.

Motion base 181 comprises fixed base 1, base support 180, which is pivotally supported on base pivot shaft 185, which, in turn is supported on fixed base 1 with pivot support members 172, 174, 176 and 178. Motion base 181, further comprises actuator 190. Actuator 190 is connected to fixed base 1 and the underside of base support 180 with rotational joints 192 and 194. Actuator 190 imparts rotational motion to base support 180.

Pivoting platform 150 is arranged for a limited range of pivoting motion, which stops when it reaches base support 180. Cushioning means, such as spring 170, may be used to absorb the impact of stopping.

Horizontal pivot shaft 155 is arranged to be perpendicular to base pivot shaft 185. Mass 10, in its non-operative position has pivoting platform 150 leaning on one side. When Actuator 190 starts pivoting base support 180, mass 10 begins to rotate. When mass 10 passes over horizontal pivot shaft 155, mass 10's weight pivots pivoting platform 150 on its other side. When this happens, a "down-hill" position is created for mass 10's providing maximum torque for mass 10's rotation. This "helps" mass 10 to develop angular momentum.

Another preferred embodiment (not shown) includes pivoting platform 150, pivoting on top of a motion base with more than one degree of freedom. Yet, another preferred embodiment has pivoting platform 150 pivoting on a synergistic motion base, such as the one illustrated in FIG. 1.

Figure 5:
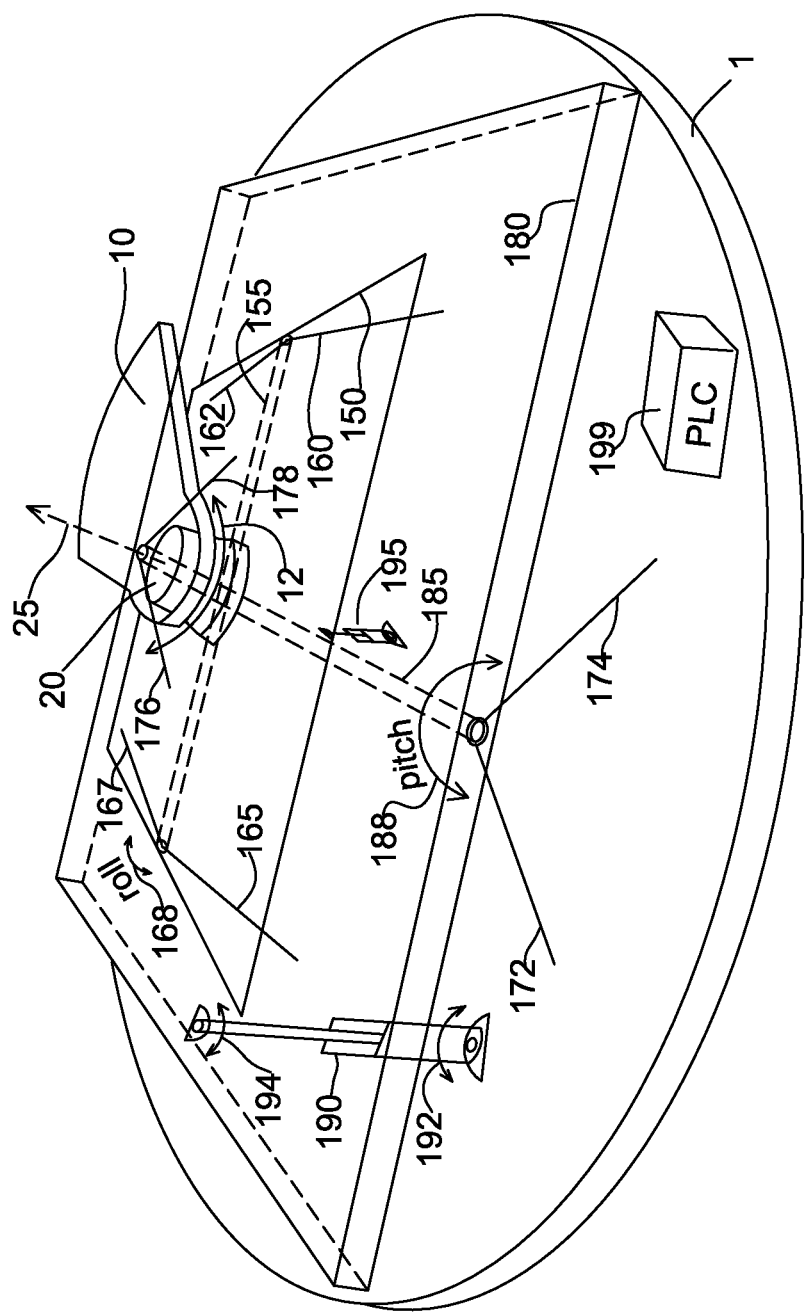
FIG. 5 shows a perspective view of a preferred embodiment of the turbine utilizing a pivot support for the eccentrically rotating mass with an actuator.

FIG. 5 shows the turbine shown in FIG. 4, further including actuator 195, connecting base support 180 to pivoting platform 150, with rotational joints. Actuator 195 optimizes mass 10's rotation, by controlling the pivoting of pivoting platform 150. Control means 199 monitor mass 10's angular momentum and controls the activation of actuators 190 and 195, in a coordinated manner to optimize mass 10's rotation.

Figure 6:
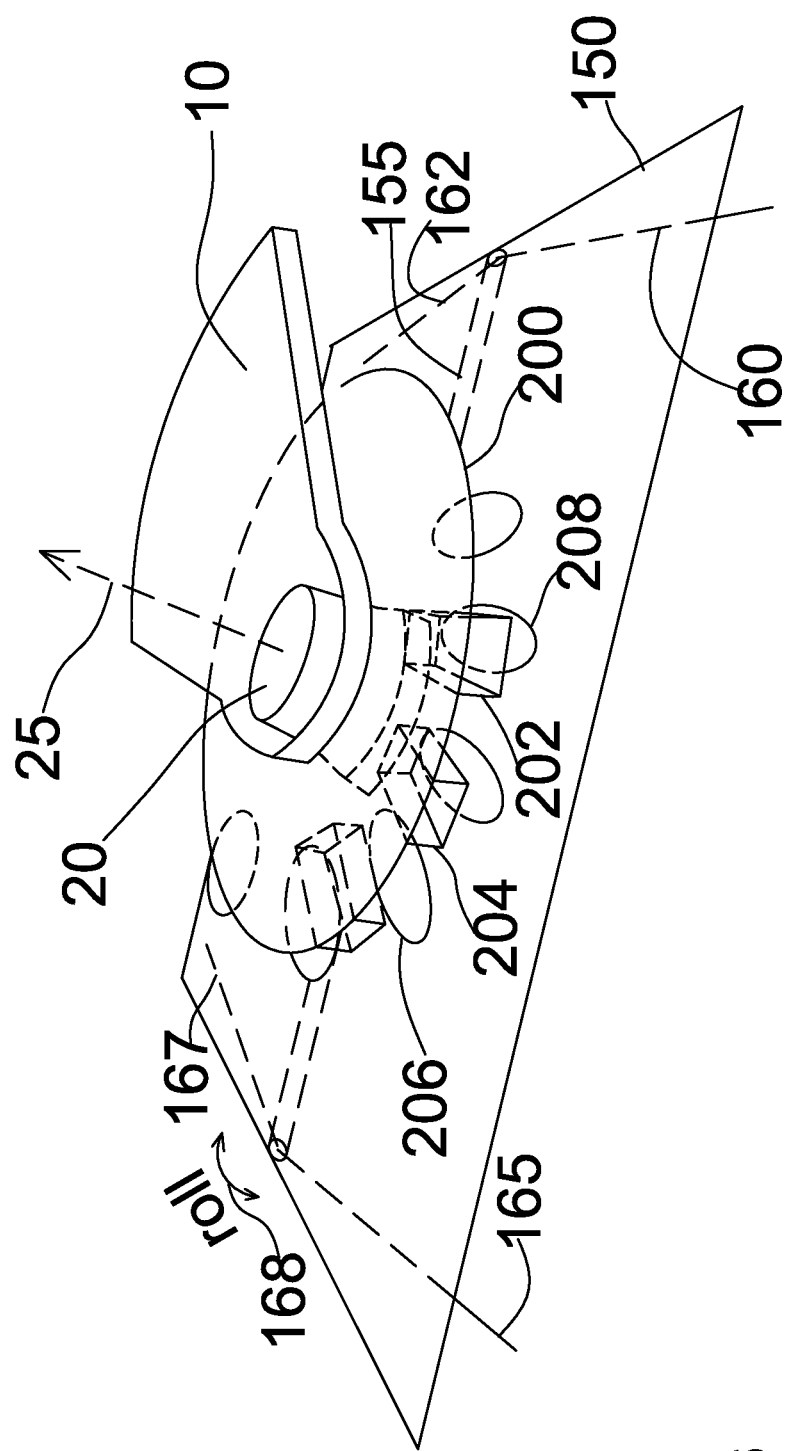
FIG. 6 shows a perspective view of an axial flux electromagnetic rotational generator used with the turbine.

FIG. 6 illustrates an electrical generator added between pivoting platform 150 and mass 10. The generator includes disc 200, which is in rotational communication with mass 10. Disc 200 has in its underside attached magnets such as 202 and 204, with proper polarity arrangement and magnetic field direction, facing coils 206, 208. The coils are supported by pivoting platform 150. When mass 10 rotates, the coils produce electricity. This is an implementation of an axial flux generator. This generator pivots along with shaft 20, in direction, 168. Other embodiments (not shown) have a stator attached on shaft 20, while having the rotor in rotational communication with the eccentric mass 10.

Figure 7:
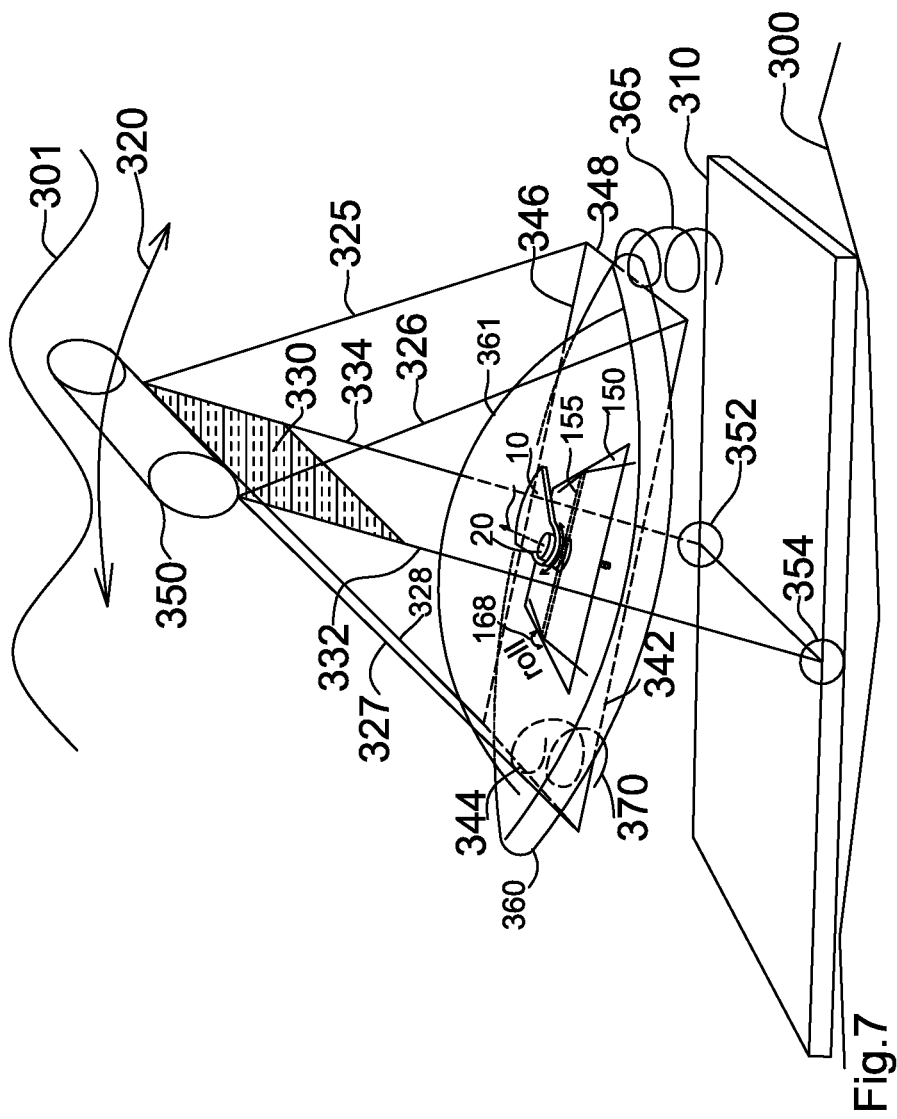
FIG. 7 shows a perspective view of a preferred embodiment of the turbine in a near-shore underwater operation.

FIG. 7 illustrates a preferred embodiment of the turbine in underwater operation, near-shore. The eccentric mass rotating mechanism is enclosed in a buoy, supported by beam means, which pivots about a horizontal pivot, provided by a fixed base in the ocean floor. More specifically, submerged buoy base 360, completely covered and protected by sea water with buoy roof 361 fully encloses all eccentric mass rotation mechanism and pivots shown in FIG. 4 (shown only partially here). Underwater fixed platform 310 is secured on the ocean floor 300. Vertical beam means such as pivoting frame comprising rods 332 and 334, is connected on the buoyant panel assembly, which here includes panel 330 and float 350. Included in the beam means, supporting frame 342, 344, 346, 348 securely supports submerged buoy base 360. Pivot points, or hinges 352 and 354, pivotally support rods 332 and 334. The buoyant panel is disposed to receive the surge motion of ocean waves 301. When ocean surge moves the buoyant panel, the beam means pivots in directions 320. Stop springs 365 and 370 may be used to provide limited range of pivoting.

This embodiment, although in different scale and environment utilizes analogous functional elements as in previous embodiments, that is: (i) a base support for the pivoting platform, shaft and rotating mass mechanism (submerged buoy base), (ii) a base pivot (beam means), (iii) a fixed base (underwater fixed platform) and (iv) an actuator (buoyant panel). The waves' surge is the prime source of power, here, as, for example, electricity powers an electric actuator.

Figure 8:
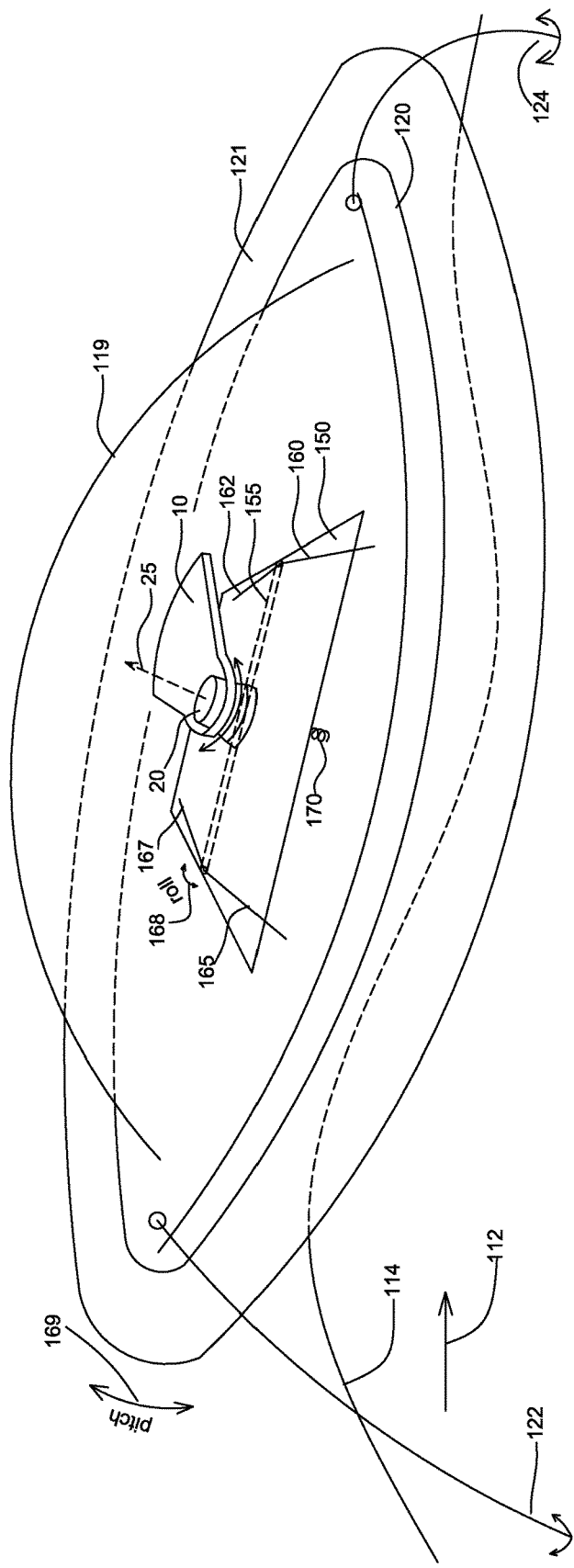
FIG. 8 shows a perspective view of a preferred embodiment of the turbine operating in the ocean utilizing a pivoting support for the eccentrically rotating mass.

FIG. 8 illustrates a preferred embodiment operating on the ocean surface. Pivoting platform 150 is pivotally supported by pivot support members 160, 162, 165 and 167, which are fixed on vessel 120, as shown. Pivoting platform 150 supports shaft 20 and mass 10, which rotates about shaft 20. Vessel 120 is moored with mooring means such as anchors 122 and 124, to maintain horizontal pivot shaft 155 substantially parallel to the direction of waves 112. Pivoting platform 150 rolls in directions 168, at a restricted range of pivoting motion limited by the vessel's floor. Cushioning means, such as spring 170 can be used to absorb the impact of platform 150's stopping, in both sides of its pivoting. Waves 114 impart pitching motion to vessel 120 in the direction 169. Vessel 120 imparts the same pitch motion to shaft 20. When the waves pitch vessel 120, mass 10 starts rotating about shaft 20. When mass 10, passes on top of horizontal pivot shaft 155, pivoting platform 150 rolls in its other side, instantly providing a "down-hill" with maximum torque for mass 10, in a direction substantially perpendicular to the direction 114 of the waves. Therefore, shaft 20 is provided with the capability of inclining towards the pitch and roll directions, in a coordinated way, so that mass 10 completes full rotations, instead of oscillations.

Roof 119 totally encloses pivoting platform 150, shaft 20 and mass 10, protecting them from sea water. In addition, a tube float such as tube float 121 can be securely attached on vessel 120's body, surrounding vessel 120, as shown in FIG. 8. Tube float 121 is used to keep vessel 120 substantially horizontal, when floating in still water.

Another embodiment further includes an actuator, similar to actuator 195, shown in FIG. 5 connecting the underside of pivoting platform 150 with vessel's floor with rotational joints and control means and sensors for monitoring wave characteristics, turbine load and mass 10's position and rotational dynamics, such as angular velocity and momentum. Control means controls the operation of actuator 195, which optimizes the pivoting angle, position and dynamics, such as speed of raising or lowering pivoting platform 150, in order to provide mass 10 an optimized rotation. Another embodiment further includes additional actuators for better stability and pivoting of pivoting platform 150. Another embodiment further includes a swivel supported on vessel 120, supporting the eccentric mass mechanism, in order to modify the alignment of pivoting platform 150, if needed, depending on the waves' direction.

The following 3 paragraphs below contain text exactly as shown in Provisional Patent application 62/210,455, submitted by the present inventor. This prov. appl. was in the Cross-Reference to Related Applications section of patent application Ser. No. 15/193,104 as well as the present application. The text clearly recites that the source of power to the turbine, mentioned throughout this application and appl. Ser. No. 15/193,104 is an external to the turbine, power source: 62/210,455, Description, $2^{nd}$ § "This secured support with the universal pivoting capability is subjected to the forces of an external prime source of power and constitutes the secured universal pivoting support means. The secured universal pivoting support means may be a universal joint (also called u-joint or Cardan joint) including more than two hydraulic pistons connected in a manner to provide tilting to the u-joint at more than one plane. In this case the prime source of energy is compressed fluid. Another secured universal pivoting support means may be embodied by a tripod consisting of three piezoelectric or electro-active polymer actuators supporting a platform with a hole in the middle. This hole is the preparation where a miniature eccentric mass can be bearing-mounted. When voltage is supplied to these actuators—tripod legs, they can cause the inclination of the platform's level and the eccentric mass' rotation. In this case the prime source of energy is voltage . . . . Prime source of power can also be the human arms causing the inclination of the secured universal pivoting support means."

Also 62/210,455 pg 16, $1^{st}$ § : "In another preferred embodiment, compressed fluid is used as a prime source of energy, which is provided through a combustion process or wave point absorbers, such as wave bobbing buoys connected to pistons, well known in the art. In the latter case, the turbine's adjustable platform is secured through a secured universal pivoting support means utilizing a u-joint mechanism on a secure sea platform supported by the bottom of the sea. Around the sea platform, wave energy converting buoys generate fluid under compression, through hydraulic means, which is used as prime source of power for the secured universal pivoting support means".

Also 62/210,455 pg 14, penultimate § : "prime power source is applied at discrete instances and not continuously, thus making the Dynamically Adjustable Rotational Level of the Eccentric Mass (DARLEM) turbine very efficient. Such a source of power can be a combustible fuel, i.e. natural gas, or a clean renewable source such as the ocean waves."

In addition, 62/210,455 drawings: FIG. 4, FIG. 6 and FIG. 9, clearly show that the prime source of power is external and it can be supplied by a variety of methods as mentioned above, including a compressed fluid, natural gas and ocean waves. FIG. 9a, of the present application illustrates this external source of power 299, as also it was shown in 62/210,455 appl. FIG. 6. In addition, FIG. 9a shows the control means 199 (PLC with sensors), as it was also shown in FIG. 5 of application Ser. No. 15/193,104 and FIG. 8 of prov. appl. 62/210,455.

Figure 9B:
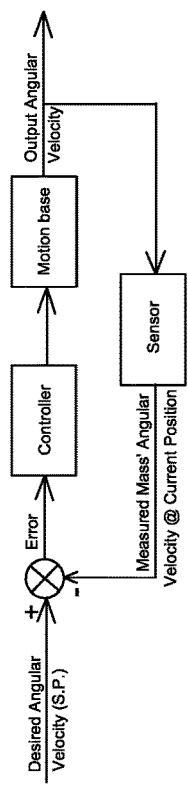
FIG. 9b shows a closed loop control diagram.
Figure 9A:
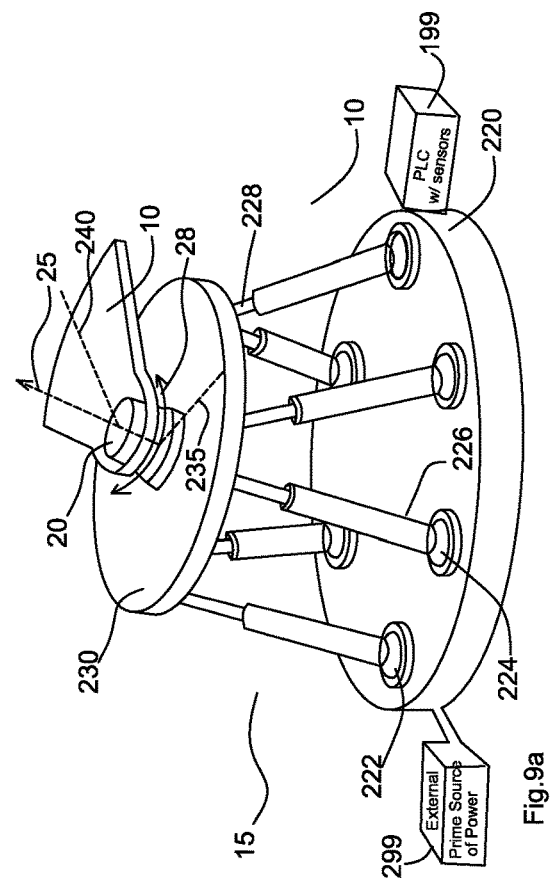
FIG. 9a shows a perspective view of a preferred embodiment of the turbine including an external prime source of power and a control means with sensors.

FIG. 9b of the present application shows the diagram of the control means, as it was described in application Ser. No. 15/193,104, pg. 10, $1^{st}$ and $2^{nd}$ full § : "FIG. 1 illustrates the instant at which the shaft support is creating a "down-hill" for mass 10. The lowest point of the inclination is indicated by radius 235, while mass 10's position is indicated by radius 240. Mass 10 will rotate "down-hill", from this beneficial position, with a maximum torque, which is generated by the gravitational forces exerted on mass 10, at this instant. Control means (not shown), such as a programmable logic controller with sensors, monitors the dynamics of rotation of eccentric mass 10, which is slowed down by the load of the turbine, which resists rotation, such as compressor applications or electricity production (not shown). The control means provides feedback to motion base 15, which imparts optimized movements and inclinations to shaft 20 in order to have optimized forces applied on mass 10 and overcome the resistive forces of the load. At least two degrees of freedom, as mentioned above, can provide with powerful rotations." Also, in pg. 8, $1^{st}$ full § : " . . . the control system monitors the . . . angular velocity".

The block diagram of FIG. 9b shows a feedback control system designed to achieve a desired angular velocity. The desired angular velocity's set point (S.P.) value is entered in the controller. The measured angular velocity and the current position of the mass are retrieved by the controller from the sensor which monitors the dynamics of the mass rotation. The measured angular velocity at current position is subtracted by the S.P., and the resulted error is used by the controller to adjust the positioning of shaft 20, through the repositioning of the motion base's support platform 230. The controller can instruct the motion base, according to the error, to provide an inclination for the mass to follow, such as the "downhill" discussed in the above paragraph.

Figure 10:
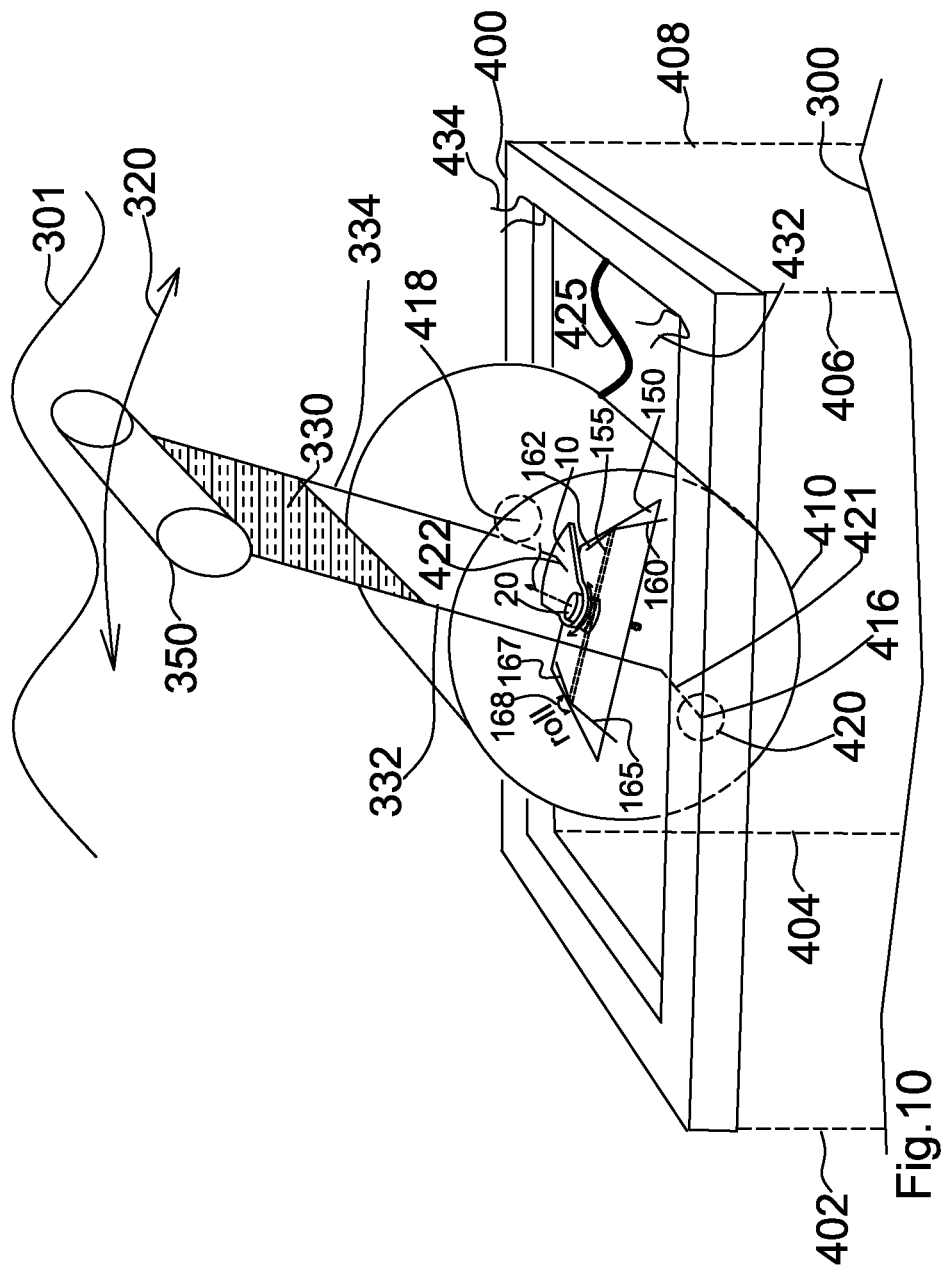
FIG. 10 shows a preferred embodiment of the turbine utilizing a submerged floating frame, supporting a buoy.

FIG. 10 shows a preferred embodiment of the turbine in an underwater operation, offshore. Submerged floating frame 400 is moored to the ocean floor 300 with mooring lines 402, 404, 406 and 408. Buoy 410 is pivotally supported on frame 400, with pegs 421 and 422 which are fixed on buoy 410's outer surface. The eccentric mass mechanism is entirely enclosed inside buoy 410, as shown in this figure and described in more detail in FIG. 7's description above. The mechanism's supporting legs 160, 162, 165 and 167 are fixed on buoy 410's lower internal wall. Frame 400 is moored so that the horizontal pivot shaft 155 is substantially parallel to wave direction. The wave surge power is the external source of power used in this embodiment. The wave surge forces are exerted on the buoyant panel. The buoyant panel can be a single hollow panel or a panel assembly of panel 330 and float 350. The buoyant panel is securely mounted on buoy 410 and keeps shaft 20 in a substantially upward position, in still water. The wave surge forces the buoyant panel to pivot back and forth in the directions of arrows 320. Along with the buoyant panel, buoy 410 and the eccentric mass mechanism pivot as well. The back and forth pivoting sets eccentric mass 10 in rotation around shaft 20. Electricity can be produced by a permanent magnet generator, included inside the buoy and having its rotor rotatably connected to the rotating eccentric mass 10. FIG. 6 above shows such a configuration.

A preferred embodiment utilizes a stop to limit buoy 410's pivoting. A rope, an elastic belt or a spring can be used as belt 425. Another preferred embodiment uses as a stop, a brake mechanism applied on pegs 421 and 422. Such a brake mechanism can be a friction brake, compressed fluid brake and dynamic or regenerative motor brake, all well known in the art. FIG. 10 shows motor/generator 420 securely housed in frame 400. Motor/generator 420 is rotatably connected to peg 421, either directly or with gearing means. When the motor/generator is not in operation, peg 421 pivots freely about frame 400. When in operation, the motor/generator can limit buoy 410's pivoting working as a brake, such as a dynamic brake. It can lock, temporarily, the peg's rotation when the buoyant panel has reached a "dead" point, that is a point in which the buoyant panel is fully stopped and about to start moving in the opposite direction. This may happen if the mass has not already passed over shaft 155. The temporary immobilization of the buoy gives time to the mass to continue its rotation towards the direction it was heading, and due to momentum, pass over shaft 155. Then, the motor/generator can immediately release this momentary lock to the peg so that the buoyant panel starts pivoting in the opposite direction, "catching up" with the wave, now though, synchronized with the mass rotation.

Figure 11:
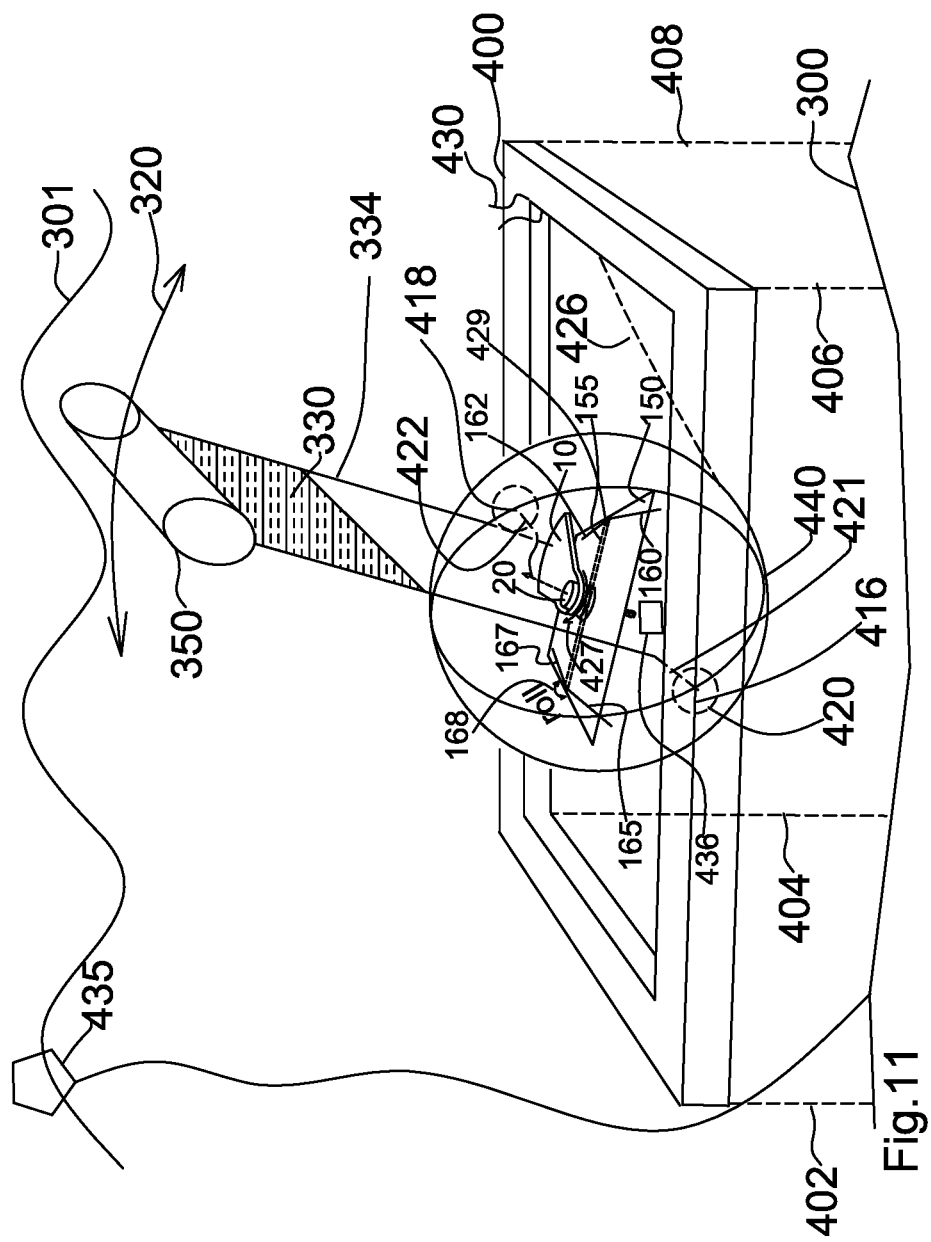
FIG. 11 shows a preferred embodiment of the turbine utilizing a submerged floating frame, supporting a spherical buoy.

FIG. 11 shows the eccentric mass mechanism enclosed in a spherical buoy. Here, belt 426 has reached its limit and therefore the buoyant panel has reached its rightmost dead-point position. As FIG. 11 shows, mass 10, which at this instant is moving clock-wise, indicated by arrow 427, is not even in the proximity of shaft 155's right end 429, where the rotating mass was heading towards. If at this instant the buoyant panel starts moving at the opposite direction, this movement will exert to the mass forces opposing its clock-wise rotation. Synchronization of the mass rotation with the buoyant panel's pivoting can occur by temporary immobilizing the peg, as mentioned above. Another way is to switch the production generator's mode to motor. That is to switch the operation of the generator shown in FIG. 6, to motor. This motor mode can rotate the mass clockwise to bypass shaft 155. Furthermore, an additional way to succeed synchronization would be to control the mass rotation through the decreasing or increasing the production generator's torque force.

Switching generator mode to motor happens when the generator's electric current direction, flowing through its coils, is reversed. However, by only decreasing or increasing the electric current, flowing through the coils, in generator's mode, this will control the torque force applied to the rotor. This follows the same principle as in regenerative braking. Regenerative breaking, occurs when the electric current going through the generator's coils does not switch direction but it is increased. When the current is increased, the back EMF (electromotive force) exerted on the rotor increases and the rotor now requires more effort to rotate. This decelerates the rotor. If the electric current going through the rotor coils does not change direction but only decreases, then the back EMF also decreases thus "easing" up the mass rotation. This control through this "regenerative mass rotation facilitation" will assist the turbine to: i) always provide power production, unlike the case of switching to motor mode, ii) not waste the energy when increasing the torque requirement overcome (regenerative braking) and iii) achieve efficient power production as many more full mass rotations will be succeeded in the various wave periods.

Figure 12:
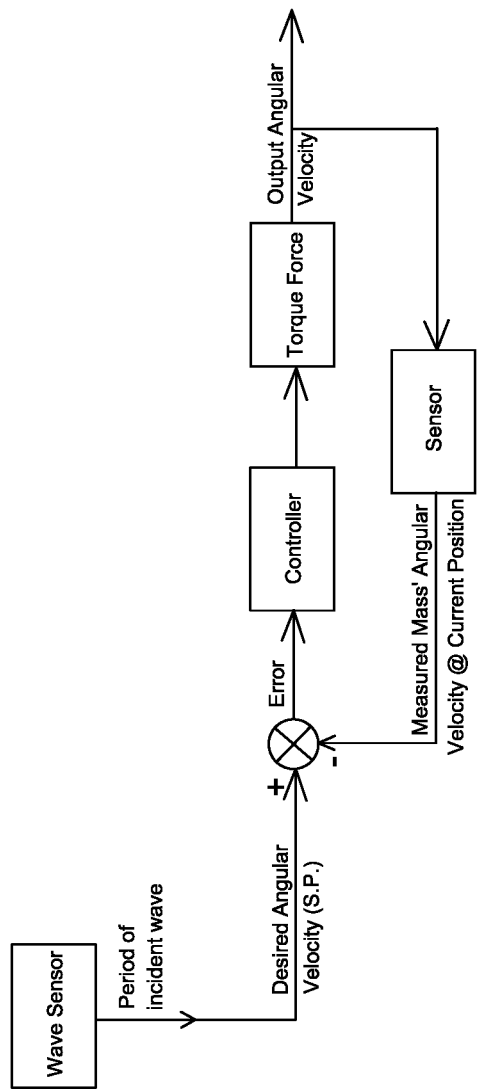
FIG. 12 shows a closed loop control diagram with a wave sensor.

FIG. 12 shows a control algorithm for controlling the mass' angular velocity through the "regenerative mass rotation facilitation" discussed above. An incident wave's characteristics sensor constantly senses the incident wave's period. This time period coincides with the time that it is desired for the mass to complete a full circle. Since this time is known, then the desired mass angular velocity for completing a 360-degree rotation, during this wave, is also known. This desired angular velocity provides the set point (S.P.). The measured angular velocity provided by the control means sensor, shown as sensor in FIG. 12, is subtracted by the S.P. and the resulted error is entered in the controller. The controller output adjusts the production generator's torque force overcome requirement, according to the error, thus increasing or decreasing the mass angular velocity with the goal to match the desired angular velocity.

The previously mentioned motor/generator 420 of FIG. 10 can provide with an additional benefit during extreme weather conditions. In these conditions, motor/generator 420 can rotate the buoyant panel downwards until it reaches its home position, for protection. The home position is when the buoyant panel is "folded", and locked on frame 400. Latching means, such as locks 432 and 434, as shown in FIG. 10, are used to latch beams 332 and 334. An additional motor/generator (not shown) may be used, rotatably connected to peg 422, for redundancy and additional rotating force.

A preferred embodiment utilizes a buoy 410 in the shape of a solid of revolution. The solid of revolution is arranged to rotate around the solid's main axis. Solids of revolution do not displace water when rotate underwater, around their main axis. This provides with a significant efficiency advantage, as the force needed to pivot a buoy, underwater, is smaller for solids of revolution than in other solids, which require an extra force to also displace a water mass, while pivoting. Thus, in the embodiment utilizing a buoy with the shape of a solid of revolution, the area of the buoyant panel exposed to the wave surge can be smaller, resulting in a geometrically smaller and therefore more efficient overall turbine. An example of such a solid is the cylinder, shown as buoy 410, in FIG. 10 or spherical buoy 440, shown in FIG. 11, which is arranged to pivot about one of its diameters.

FIG. 11 also shows a wave surge characteristics' sensor 435 for sensing an incident wave's period, and a control means with sensors 436, which monitors the dynamics of mass rotation. Wave surge characteristics buoy/sensor 435 is floating on the ocean surface and moored in proximity to the turbine. The control means with sensors 436 is enclosed in the spherical buoy 440. Both are in control signal communication. This communication can be wired or wireless.

Figure 13:
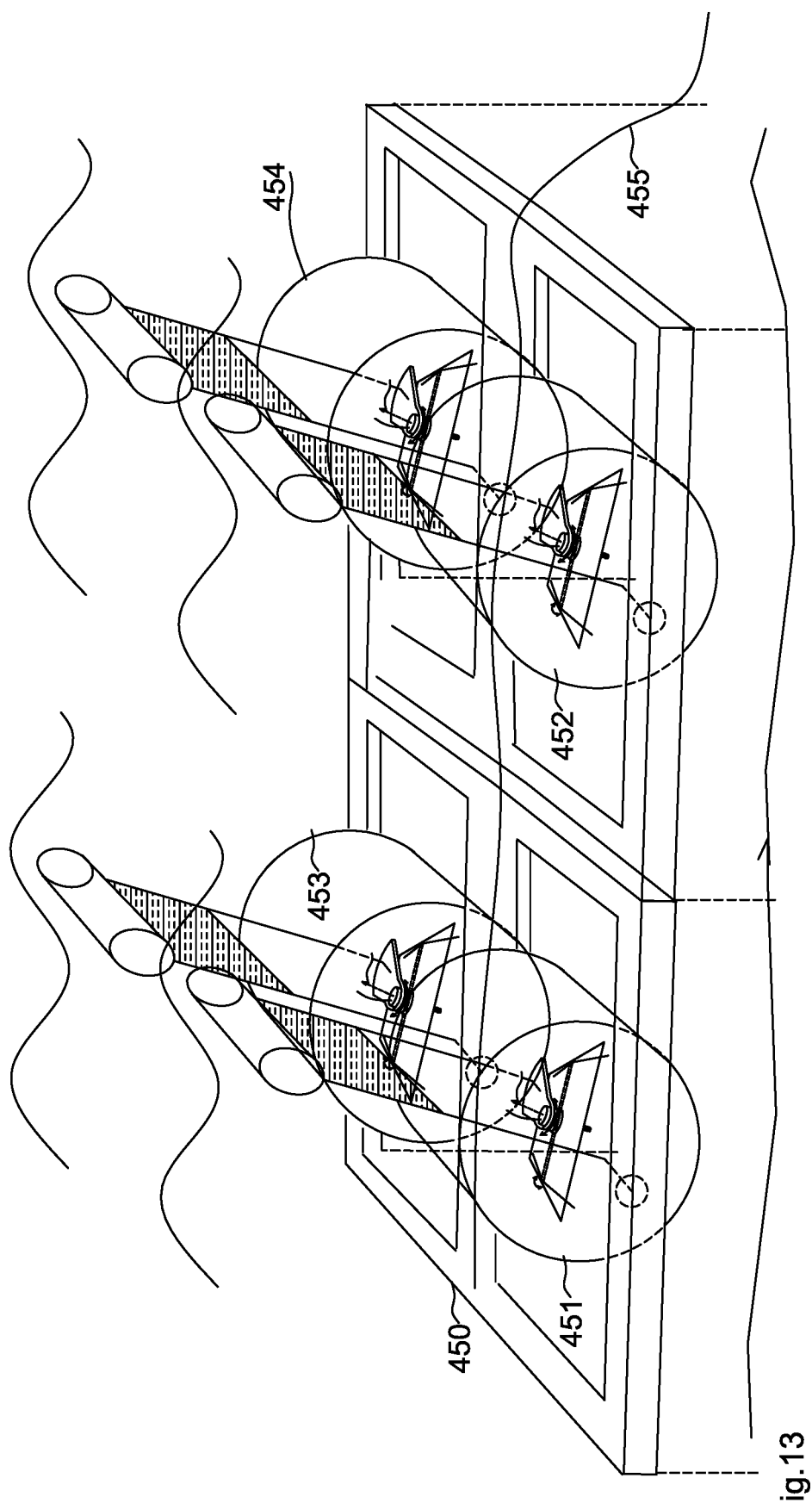
FIG. 13 shows an underwater electrical plant.

FIG. 13 illustrates an underwater power plant comprising a submerged floating frame, 450, which is moored to the ocean floor, as shown. Frame 450 supports a plurality of cylindrical buoy turbines, such as turbines 451, 452, 453 and 454, Each turbine contains the eccentric mass mechanism for electrical power production, as shown in FIGS. 10 and 11. Each cylinder further includes an electrical power production generator, as shown in FIG. 6. Also, each cylinder pivot pivots about a substantially horizontal axis, as shown. Submerged electrical cable 455 carries the electricity produced by all cylindrical turbines to the grid or to a variety of points of electrical power consumption such as a submerged docking station for unmanned underwater vehicles (UUV's), a desalination plant, or even a heat recovery storage and steam generation plant, as described in recent U.S. patent Ser. No. 10/012,113, of the same inventor.

Figure 14B:
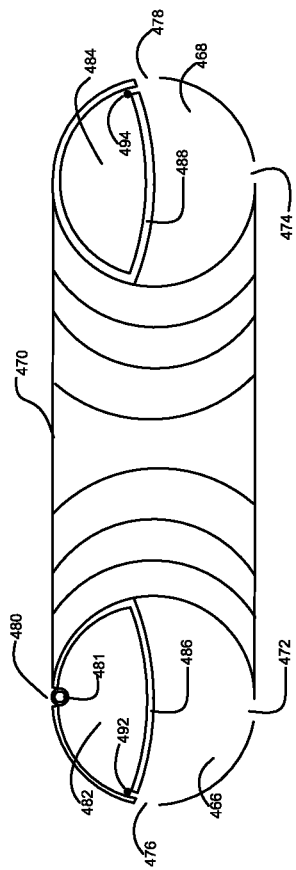
FIG. 14b shows a float with a ballast tank and a compressed air tank.
Figure 14A:
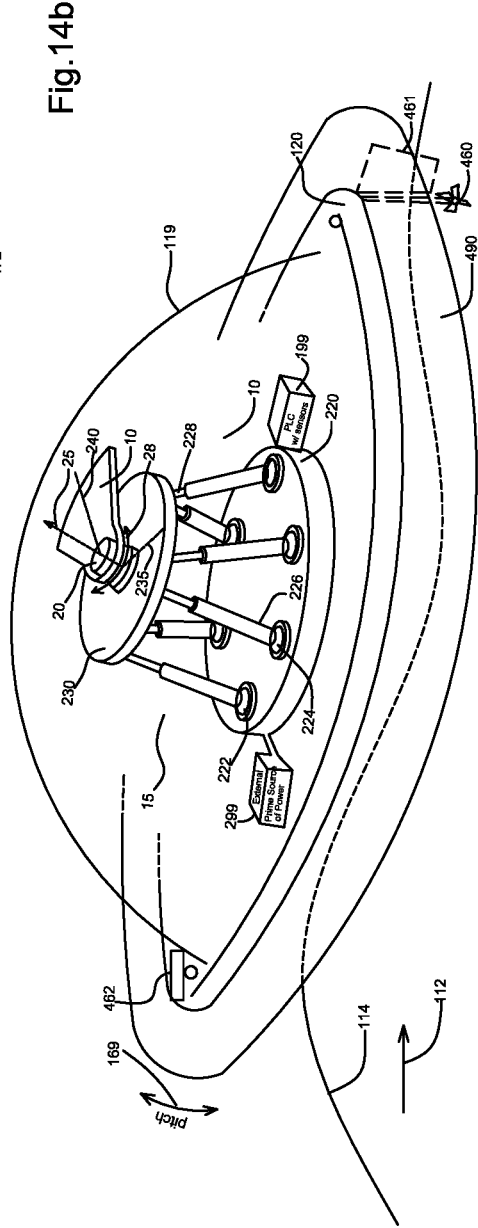
FIG. 14a shows a floating turbine with a ballast tank.

FIG. 14a shows the embodiment of FIG. 9a floating on the surface of the ocean, being entirely enclosed in a vessel surrounded securely by the horizontally positioned toroidal float 490, which keeps shaft 20, substantially vertical in still water, as it was described above. This embodiment is further equipped with a marine propulsion engine 460 and a steering rudder 461. Using the propulsion engine, the turbines transportation from and to the electricity production ocean sites does not require a tag boat. During this transport the rotating mass is immobilized at a home position by chain means.

In addition, this embodiment is equipped with an air compressor 462, which is in fluid communication with the upper surface of float 121.

FIG. 14b shows a vertical cross section of float 490. Internally, the float is divided into two sections by an internal horizontal and continuous divider wall indicated by 486 and 488. The lower section is the ballast tank indicated by chambers 466 and 468 and the upper section is the compressed air tank indicated by 482 and 484.

In extreme weather, flood ports 472 and 474 open, allowing ocean water to enter the ballast tank. During this process the air vents 476 and 478 remain open. As a result, the vessel sinks under the surface of the water for protection. When the harsh conditions are over, the flood ports open and high-pressure air is introduced into the ballast tank through the air valves 492 and 494. The air vents 476 and 478 will be closed. The air pushes the water out of the ballast tank through the flood ports. Once the weight of the water is removed, the vessel rises up again to the surface of the ocean. Compressed air is replenished into the compressed air tank through compressed air inlet 480 and inlet valve 481. Air compressor 462, shown in FIG. 14a is in fluid communication with inlet 480. While submerged, the rotating mass still continues to produce electricity by the rotating mass 10.

FIG. 15a illustrates a preferred embodiment in underwater operation, which utilizes a buoyant pivoting panel, such as the panel 330 in plane 331, with the float 350. The buoyant pivoting panel is disposed to capture the surge motion of ocean waves 301. It is supported by beam means such as rods 332 and 334. The rods are fixed on cylindrical buoy 410, which can pivot about its main axis. External pegs 421 and 422, which are aligned with buoy 410's main axis, are fixed on the buoy's external surface. The pegs pivotally support buoy 410 on a pivoting base, such as the pivoting rings with legs 501 and 502. The pivoting base is secured on the ocean floor 300.

Buoy 410 encloses electrical generator 500, which is fixed on the buoy's internal wall with supports 503 and 504. The generator's rotor shaft 510 is coaxial with the cylindrical buoy's main axis and it is securely supported on the buoy's internal wall with bearing 511, which is fixed on the buoy's wall, as it is shown in FIG. 15a.

Buoy 410 also encloses mass 505, which can securely slide or roll on mass guide rail 506, which is fixed on buoy 410's internal walls, as it is shown in FIGS. 15a, 15b, 15c. Mass 505 reciprocates on rail 506 when the ocean wave surge motion pivots the pivoting panel and therefore rotates back and forth the cylindrical buoy on its main axis. FIGS. 15b and 15c are side views of the buoy, both viewed from the same side, at two different instances of the buoy's pivoting, partially illustrating the mechanism enclosed in buoy 410.

Mass 505 is securely attached to belt or chain 514 with coupling 518, as it shown in FIGS. 15a, 15b and 15c. Chain 514 provides clockwise rotation to freewheel 516, which is secured on rotor shaft 510, as it is shown in FIGS. 15a and 15b. FIG. 15b shows an instant when the wave surge has pivoted buoy 410 and mass 505 started rolling downwards, pulling chain 514 through pulleys or sprockets 512 and 513 to transmit rotational power to freewheel 516. Mass 505 pulls chain 514 in the direction shown by arrow 519, which rotates freewheel 516 in a clockwise rotation as shown by arrow 517. This rotational power is transferred to generator's rotor shaft 510, shown in FIG. 15a. When mass 505 reverses its direction due to the panel's pivoting on the opposite side, freewheel 516 is disengaged, rotating freely, without providing any rotation to the rotor shaft.

Mass 505 is also securely attached to chain 524 with coupling 528, as it is shown in FIGS. 15a and 15c. Chain 524 provides also clockwise rotation to freewheel 526, which is secured on rotor shaft 510, as it is shown in FIGS. 15a and 15c. FIG. 15c shows an instant when the wave surge has pivoted buoy 410 and mass 505 started rolling downwards, pulling chain 524 through pulleys or sprockets 522 and 523 to transmit rotational power to freewheel 526. Mass 505 pulls chain 524 in the direction shown by arrow 529, which rotates freewheel 526 in a clockwise rotation as shown by arrow 527. This rotational power is transferred to generator's rotor shaft 510, shown in FIG. 15a. When mass 505 reverses its direction, freewheel 526 is disengaged, thus rotating freely without providing any rotation to the rotor shaft.

In this preferred embodiment, the reciprocating mass 505 provides unidirectional rotation to the generator's shaft, with its reciprocating motion on the guide rail, thus activating the electrical power 500 to produce electrical power.

An electrical cable, 509, disposed on the seabed 300, exits the buoy, in a water tight manner, to transfer the electrical power produced by generator 500 to the application needing the electrical power, such as the electrical grid.

Figure 16A:
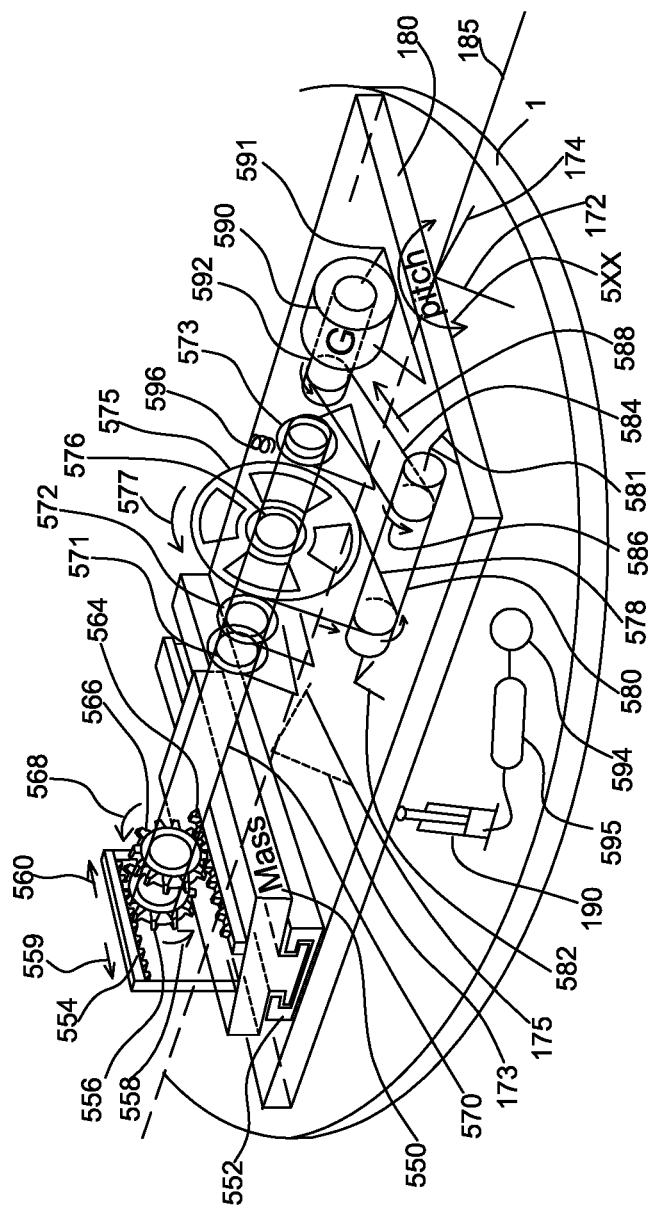
FIG. 16a shows a reciprocating mass embodiment utilizing a flywheel.

FIG. 16a illustrates another preferred embodiment of the reciprocating mass 550 mechanism. In this embodiment mass 550 is set to reciprocating in the pitch direction due to a pivoting motion of a pivoting platform, such as base support 180, which is supported for pivoting on fixed base 1 as follows: base support 180 is pivotally supported on base pivot shaft 185, which in turn is supported by pivot support members 172, 174, 173, 175, on fixed base 1. Additional pivot support members are used (not shown) to support base pivot 180 on fixed base 1.

Actuator 190 is connected to fixed base 1 and the underside of base support 180. Actuator 190 imparts rotational motion to base support 180. Actuator 190, is powered by an external power source, such as diesel air compressor 594 connected to compressed air tank 595. A spring, such as spring 596 may be used to help base support 180's pivoting motion.

The pivoting motion imparted to base support 180, sets guide rail 552, which is fixed on base support 180, in pivoting motion as well. As the guide rail pivots, mass 550 slides or rolls on the pivoting guide rail back and forth. Gear racks 554 and 564 are fixed on mass 550 and engage freewheel gears 556 and 566, respectively. Both freewheel gears are mounted on shaft 570. Shaft 570 is securely supported on base support 180 on bearings with secure bases such as 571, 572 and 573. Shaft 570 can freely rotate about these bearings. Gear racks 554 and 564, being fixed on reciprocating mass 550, provide reciprocation motion to freewheel gears 556 and 566, respectively. Both freewheel gears are engaged in a counterclockwise rotation, while they can rotate freely, clockwise. When mass 550 moves towards the direction of arrow 560, gear rack 564, being engaged on freewheel 566 forces its counterclockwise rotation, as also shown by arrow 568. Since freewheel gear 566 engages in the counterclockwise direction, it forces shaft 570 to rotate in the counterclockwise direction, as well. While mass 550 moves towards the said direction of arrow 560, gear rack 554, being in contact with freewheel gear 556, it forces its clockwise rotation, which does not provide any rotation to shaft 570. This is due to the fact that freewheel gear 556 also engages in the counterclockwise rotation, as mentioned. In the clockwise rotation freewheel gear 556, simply rotates freely about shaft 570, which at the moment, may be in a counterclockwise direction.

When mass 550 and gear racks 554 and 564 move at the opposite direction, indicated by arrow 559, freewheel 556 is forced to a counterclockwise rotation by gear rack 554, and since the freewheel gear engages in counterclockwise rotation, it forces shaft 570 to rotate counterclockwise, while the other gear, gear 566 rotates freely clockwise around shaft 570, forced by gear rack 564. Therefore, when mass 550 moves back and forth, it provides a useful and efficient unidirectional rotation to shaft 570, which for the embodiment of FIG. 16a is the counterclockwise rotation.

Flywheel 575 is also mounted for rotation on shaft 570, as shown in FIG. 16a. The flywheel is mounted on freewheel 576. Freewheel 576 also engages in the counterclockwise rotation. When shaft 570 rotates counterclockwise, due to the reciprocating motion of mass 550, shaft 570 forces flywheel 575 on counterclockwise rotation shown by arrow 577, as freewheel 576 engages in the counterclockwise rotation. If mass 550, momentarily stops, flywheel 577, due to momentum, continues to rotate freely about shaft 570, thus releasing its kinetic energy accumulated. It continues to rotate freely because freewheel 576, can rotate freely clockwise or allow flywheel 575 to rotate counterclockwise when shaft 570's rotation is stopped.

Flywheel 577 transfers its rotational power, imparted by mass 550, to generator 590, utilizing rotational communication means as follows: FIG. 16a shows belt 578 around the flywheel and roller 580; this roller is supported with fixed legs 581 and 582 on base support 180; belt 584 transfers the roller's rotational power to the generator's rotor 592. Other rotational communication means, as well as drive and gearing means, such as a gear box or drive chains, sprockets, pulleys, drive belts, gear belts, V belts etc. can be used to transfer power. Yet in other preferred embodiments the rotational power from flywheel 575 can be transferred to the generator's rotor directly.

Generator 590 is securely fixed on base support 180, as well, utilizing a secure generator base 591.

FIG. 16a shows also the power transfer from the external power source. In this embodiment, a diesel compressor, 594, is used to activate actuator 190 and eventually set shaft 570 in the unidirectional rotation which produces electrical power. Other preferred embodiments can use other prime power sources such as human hands to pivot a platform, such as platform 180, ocean wave power or even and the sun's power which naturally causes the ocean thermal gradient.

Yet, other preferred embodiments utilize a different mass, guide rail, gear racks and drive power and gearing means positioning.

Figure 16B:
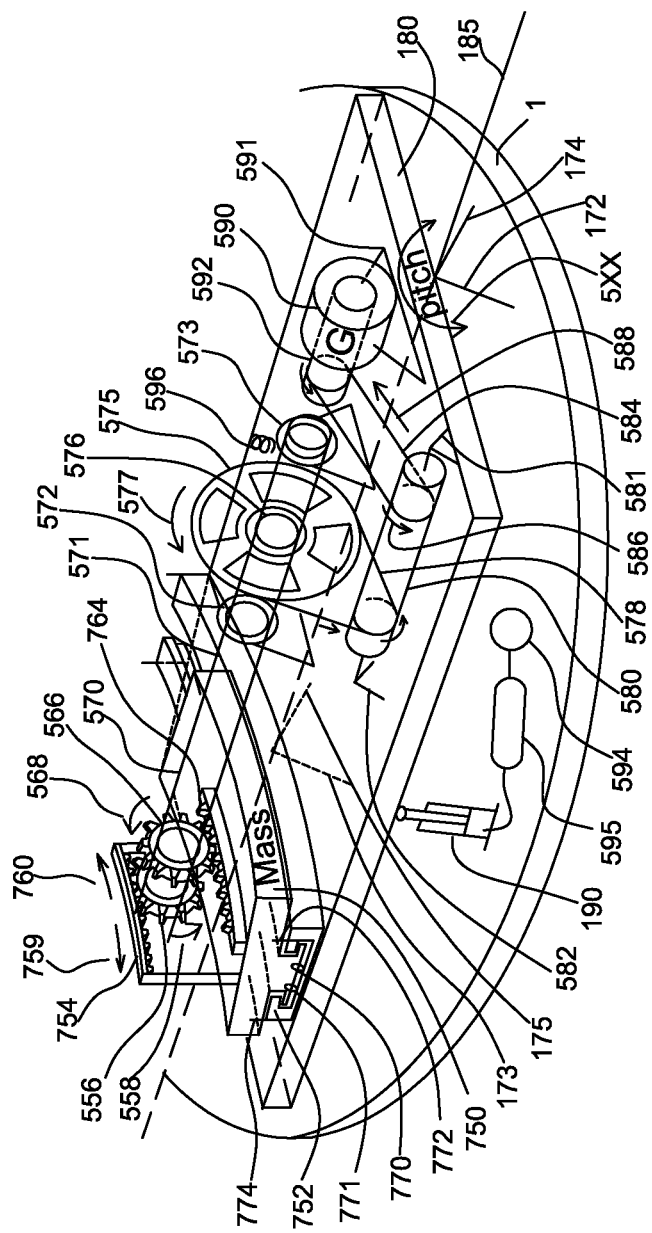
FIG. 16b shows a reciprocating mass embodiment utilizing a curved guide rail and racks.

FIG. 16b shows a preferred embodiment utilizing a curved guide rail, such as fixed guide rail 752. A suitably, to guide rail's 752 curve, curved mass 750 rolls back and forth on guide rail 752, as a result of the pitch motion of base support 180. Mass 750 rolls on guide rail 752 with wheels 770 and 771, attached on mass 750. The mass 750 stops its reciprocating motion with the use of stops fixed on base support such as stops 772 and 774. These stops can be cushions or springs to absorb the impact of stopping mass 750.

Mass 750 carries fixed gear racks 754 and 764. These gear racks have suitable curvatures to engage with freewheel gears 556 and 566 throughout their travelling path on curved guide rail 752. They reciprocate in the directions of arrows 759 and 760.

FIG. 17 shows another preferred embodiment utilizing reciprocating mass 505. A floating vessel 120 has a vessel longitudinal axis 599, substantially aligned with oncoming wave direction 112. Guide rail 506 is fixed on the floating vessel and has a longitudinal axis parallel to the vessel's longitudinal axis. Mass 505 can slide or roll on guide 506.

Ocean waves 114 pitch vessel 120 up and down in the directions shown by arrows 169, and therefore the vessel transfers the pitch motion to guide rail 506. The guide rail's pitch motion causes mass 505 to reciprocate, which causes drive chain 514 to reciprocate. Chain 514's reciprocation rotates freewheel 516. Also mass 505 causes chain 524's to reciprocate providing rotation to freewheel 526 (as shown in FIG. 15.a). The freewheels provide unidirectional rotation to a shaft 510 (as it was also shown in FIG. 15a), which activates a generator, such as the 500 of FIG. 15a, which is also fixed on floating vessel 120 and generates electrical power, which is sent to the electrical grid or power application by an electrical cable. In this embodiment the prime power source is the ocean wave activity.

A preferred embodiment utilizes also a flywheel, as the flywheel shown in FIG. 16a. Yet another embodiment may use a moored vessel with mooring means 122, as shown in FIG. 17. Yet another embodiment may use a plurality of vessels in succession. The first one is moored with mooring means, such as mooring means 122 and the others are tied in series, that is the second vessel's front part is tied with a rope or cable with first one's back part etc. creating a line of vessels aligned with the direction of the oncoming waves.

Figure 18:
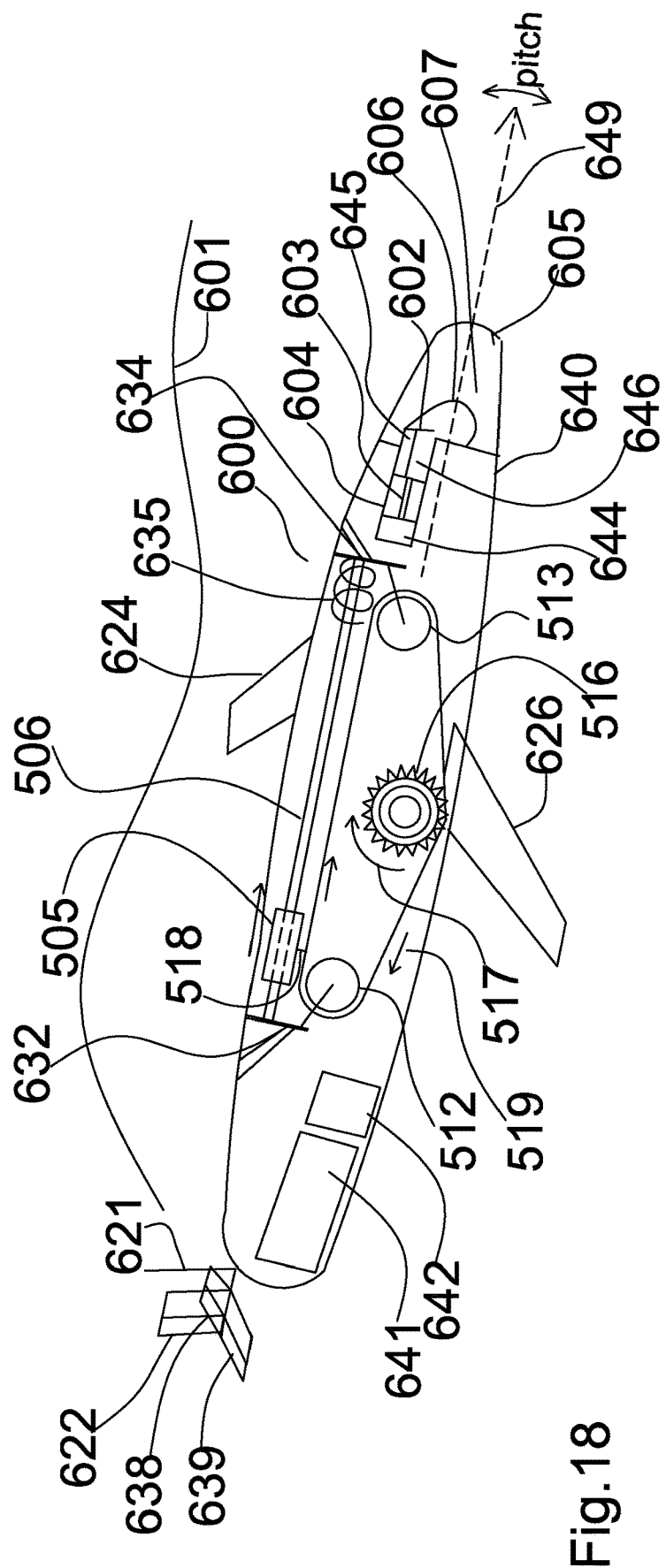
FIG. 18 shows a reciprocating mass embodiment in an underwater glider.

FIG. 18 shows an underwater glider vehicle 600, which is propelled with buoyancy control, utilizing a prime source of power. The prime source of power for an underwater glider could be the sun and the thermal gradient that is naturally created in the ocean, the hands of a human operator, a compressed air tank or, a pre-charged electrical battery.

U.S. Pat. No. 3,204,596 discloses a submersible marine craft for accomplishing a hydrodynamic propulsive movement with buoyancy control, operated by a human. A pressurizable buoyancy controlling chamber, containing water and also containing gas within a variable volume envelope means, is utilized. A pump can pump ambient water into the chamber through a valve, thus changing the buoyancy into slightly negative, forcing the craft to descent. The pump can also force the water out of the chamber, thus creating a slightly positive buoyancy for the craft to ascend.

Autonomous underwater gliders are a type of Autonomous Underwater Vehicles (AUVs) which employ a variable buoyancy propulsion, similar to the submersible craft of U.S. Pat. No. 3,204,596. The forward propulsion is succeeded with the use of hydrofoils or wings, which propel the craft or glider forward while the craft or glider is forced to move up or down when at slightly positive or negative buoyancy modes, respectively. This is why the underwater gliders follow a "saw-tooth" trajectory. Autonomous underwater glider vehicles are commercially available. For example, Teledyne Webb Research Inc. of Falmouth, Mass. has commercialized such a vehicle, called Slocum.

Autonomous underwater glider vehicles use a piston to flood or evacuate a pressurizable water compartment or chamber, located in the glider's front part or nose, which changes the vehicle's weight to provide a slightly negative or positive buoyancy for descending or ascending, respectively. Such pistons can also move oil in or out of an external to the vehicle bladder, thus practically changing the vehicle's volume and increasing or decreasing the glider's buoyancy, respectively. Internal bladders expanded by a hydraulic oil can also be used to remove water from the pressurizable water chamber, through the chamber's ambient water valve.

U.S. Pat. No. 5,291,847 discloses a thermal engine used by autonomous underwater glider vehicles. This engine is powered by the energy collected from the ocean temperature differentials through heat exchange with a temperature responsive material. The material undergoes expansion and contraction and a state change, in response to a temperature change. Wax, polyolefinic materials, a solution of carbon dioxide ammonia and other Phase Change Materials (PCMs) can be used, according to the operational temperatures needed. The energy derived by the expansion and contraction of the temperature-responsive material is stored in a resilient energy storage medium (e.g., a compressed gas, such as nitrogen) via a piston. The energy derived from the temperature differentials is used to cause a change in buoyancy for purposes of propulsion. The change in buoyancy is achieved by expanding or contracting an expandable chamber (e.g., a bladder) by pumping a low-compressibility filling material (e.g. hydraulic oil). This pumping is done by a piston being driven by the gas, as explained in U.S. Pat. No. 5,291,847. The engine requires no connection to an external source of energy to power the forward propulsion of an underwater glider.

Underwater gliders carry a payload related to the mission of its journey. Usually it comprises electronics and sensors for salinity and ocean environmental research, in general. In order to power these electronics, as well as the valves' function, GPS trans-receivers used for satellite data up/downloading, when the glider reaches the ocean surface, and data procession on board, electricity is needed on board, as well. This electricity, so far is provided to the gliders by a pre-charged battery, which is included on board. When the battery is emptied, the glider's mission stops and occasionally the vehicle is lost. Therefore, the electrical power on board is of high importance.

The electrical power generation system for use by underwater gliders with buoyancy control propulsion described herein, prolongs the battery life, and therefore the mission time of the glider. It is based on the reciprocating mass power transfer, during a glider's "saw tooth" pithing, gliding journey. This system converts into electricity a small excess of the thermal energy captured by the glider's thermal engine during its journey.

The mass reciprocation displacement range is set to be limited, so that the reciprocating mass' motion affects only minimally the vehicle's gliding dynamics. However, a driving gear of a very small diameter very small diameter, rotationally connected to the generator of the reciprocating mass turbine described herein, can provide a substantial number of revolutions of the generator rotor in the many thousands of up and down "saw-tooth" changes, or dive cycles, typically occurring during a glider's 2,000 to 3,000 Km missions. The produced power is substantial considering that a typical data rate transmission by a glider "costs" about 40 Joules per kilobyte. Also, to economize on the total vehicle weight, the reciprocating mass can be the electrical battery needed by the glider. Typically, the Slocum glider's total weight is 50 Kgr, while having a buoyancy 50.2 Kgr.

FIG. 18 shows underwater glider vehicle 600 having a vehicle housing 640, a vehicle housing longitudinal axis 649, a pressurizable water compartment or chamber 607, which occupies the glider's nose, and a thermal engine 604. The thermal engine comprises the chamber of the phase change material (PCM) and the chamber of the compressible gas, separated by a piston, and a third chamber containing hydraulic oil which is disposed to be constricted by the expansion of the expansion of the PCM and the gas. The chamber 644 shown, contains the PCM and the chamber 645 contains the compressible gas. Piston 603 provides pressure to the gas chamber 645, when the PCM is solidified at lower temperatures, such as in the deeper ocean water environment. The gas, being compressed, forces oil from oil chamber 646 to enter bladder 606 through valve 602. Assuming that the water compartment or chamber 607 was filled with ambient water, during descending, now, at deeper waters where temperatures will cause the PCM to solidify and expand, the water will exit compartment 607 through valve 605, forced by the activity of the expanding bladder 606. This will reduce the device's weight and the device's buoyancy will become larger, causing the glider's ascending to begin. When glider 600 reaches the water surface, where the water is not as cold (thermocline), the PCM will start melting, thus releasing the pressure on the gas chamber 645. Valve 602 will open and the oil that had expanded bladder 606 will return back into oil chamber 646 by the action of opening the external valve 607 for ambient water to come in into water chamber 607 and compress the bladder to empty the oil back to its chamber 646. This will flood the water compartment with ambient water, it will increase the glider's weight more than its buoyancy, and the descending motion of the glider will begin.

When the glider was at the ocean surface, the reciprocating mass 505 had travelled to the furthest point possible from the glider's nose, and close to pulley 512. At the surface, or highest point, the quantity of the water which floods the water compartment 607 for descending, tips the device's nose downwards and the descending begins. Therefore, the reciprocating mass 505, starts travelling on guide rail 506 downwards, thus causing the rotation of freewheel 517 and producing electrical power to be stored in the battery. Pre-charged battery 642 can be used, but alternatively, mass 505 can the pre-charged battery for economizing on the device's weight. The battery, will be continuously re-charged, throughout the glider's journey, by the mass reciprocation on guide rail 506, thus converting an excess of thermal energy captured by the thermal engine to electricity.

Underwater glider vehicle 600 carries payload 641, which contains all electronics and sensors for the glider's mission. The vehicle is also equipped with antenna 621 for satellite data uploading and navigational commands downloading, when it reaches the ocean surface. The glider is also equipped with wings 626 and 624, as well as rudder 622 and elevators 638 and 639, for yaw and pitch control, respectively.

Underwater glider vehicle 600 utilizes the reciprocating mass unidirectional rotation system as it was described for FIGS. 15a, 15b, 15c or in FIGS. 16a and 16b. FIG. 18, shows only partially the reciprocating mass turbine, which is used to provide shaft's unidirectional rotation in both ascending and descending of the glider.

The reciprocating mass turbine which comprises shaft 510, mass 505 mounted for reciprocation on guide rack 506, provides unidirectional rotational motion to freewheels 516 and 526. An external power source such as the ocean waves or the sun powers the pitching motion of the guide rack, whereby the external power provided is converted into an efficient rotation, which can be converted to electricity by a generator.

Figure 19:
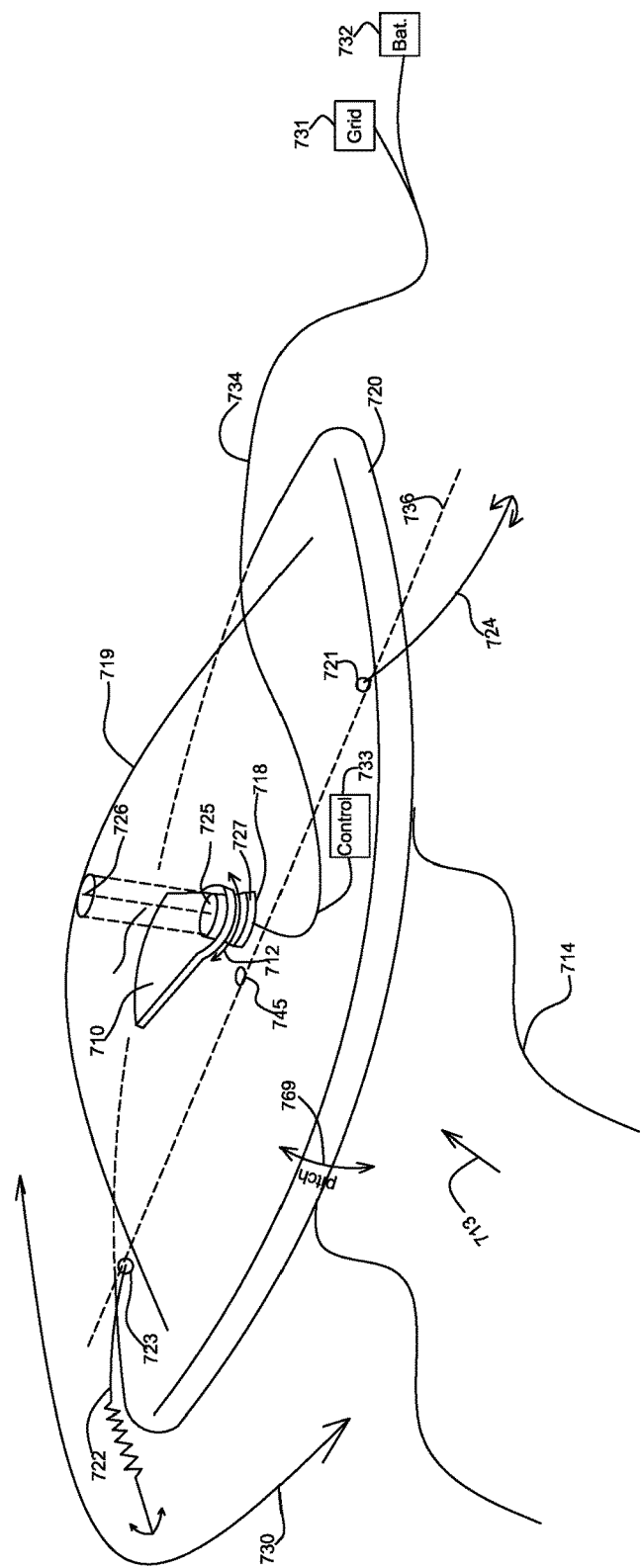
FIG. 19 shows a floating turbine with asymmetric stiffness mooring lines.

FIG. 19 shows another preferred embodiment operating on the ocean surface. It utilizes the eccentric mass 710 which is mounted for rotation in the directions of arrows 712, about an upwards shaft 725. Bearings facilitate the rotation about the shaft.

Vessel 720 floats on the ocean waves 714, which have a direction 713. Shaft 725 and eccentric mass 710 are entirely enclosed in vessel 720 by vessel roof 719. Shaft 725 is fixed on vessel's floor 718.

Mooring lines are used to prevent the unconstrained yaw rotation of the vessel. FIG. 19 shows mooring lines 722 and 724 secured on substantially opposite placed vessel mooring supports 723 and 721. Vessel 720 is moored in a position that mooring supports 723 and 721 are on a line, line 736, substantially perpendicular to wave direction 713.

The mooring lines on each mooring support have different stiffnesses. Mooring line 722 has a higher elasticity than line 724. When vessel 720 is pushed back and forth by surging waves 714, mooring line 722, being more elastic than line 724, allows the vessel to swing in a limited elliptical back and forth surging pathway such as arc 730, and not in a straight line. Along this arc pathway, the vessel moves in a combined motion, which includes a limited yaw displacement as well. This limited yaw displacement occurs due to the stiffness of line 724 acting upon mooring support 721 and therefore keeping it in a more restrained position than mooring support 723, which is tied with the more elastic line 722. The vessel's elliptical pathway travelling and limited yaw displacement motion is also transferred to fixed shaft 725, which in turn swings the eccentric mass 710, thus promoting the mass' rotation around the shaft more efficiently than if the vessel were to move back and forth on a straight-line pathway.

The difference in mooring line stiffnesses is an asymmetry which is used to promote the mass rotation. Additional preferred embodiments incorporate additional asymmetries, such as the asymmetric positioning of the mass's shaft at a point on the vessel floor which does not belong to an axis of symmetry of the vessel. Yet, other preferred embodiments utilize vessels of different shapes from the oval shape used for the vessel shown in FIG. 19, or a circular shape.

In another preferred embodiment, the shaft 725 of FIG. 19 is upwardly extended and fixed on the vessel roof 719 at point 726, as it is shown by the dashed lines in the figure. Also in a preferred embodiment, generator 727 is fixed on vessel's floor 718 and generates electricity, as shown in FIG. 6. In other preferred embodiments the generator is supported by a table fixed on the vessel floor. Yet, in another preferred embodiment the generator is fixed under the roof of the vessel. Furthermore, other preferred embodiments utilize a gear box to transfer rotation from the eccentric mass to the generator.

The turbine of FIG. 19 can provide electricity to the electrical grid 731 via underwater cable 734, or to a battery array 732. A control means 733 comprising electronic monitoring of the angular velocity of the eccentric mass as well as activation of the mode switch of the generator mode to motor mode for maintaining the mass angular velocity at a minimum value when the waves do not cause the angular motion of the mass above this minimum value. A plurality of turbines can be in an ocean farm configuration, which can generate electrical power at a large scale.

Figure 20:
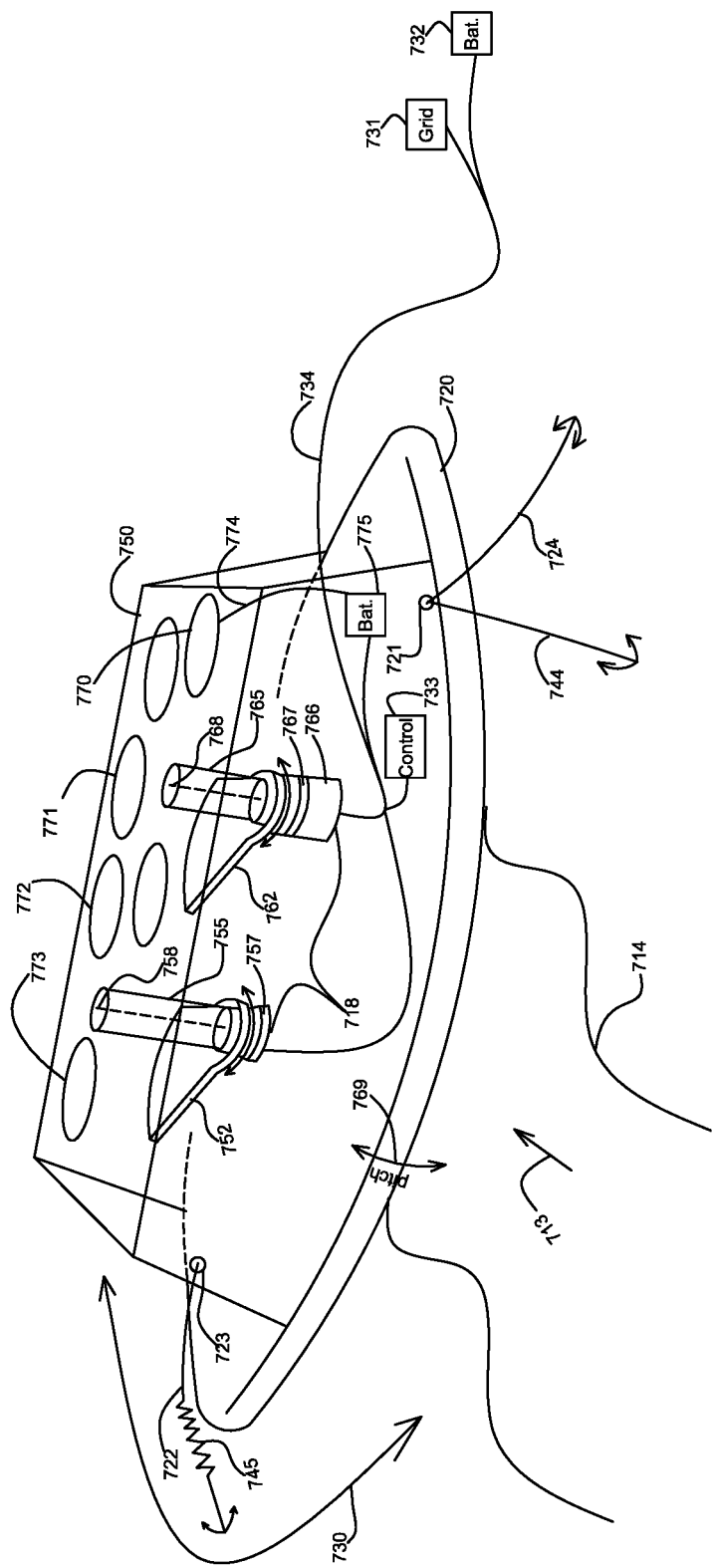
FIG. 20 shows a floating turbine with a plurality of eccentrically rotating masses and solar cells.

Another preferred embodiment utilizes a plurality of eccentric masses bearing mounted for rotation about corresponding shafts which are fixed inside a vessel similar to the vessel of FIG. 19. FIG. 20 shows a preferred embodiment which comprises two eccentric masses 752 and 762, which are bearing mounted for rotation about corresponding shafts 755 and 765. Eccentric mass 752 provides rotation to generator 757, which is fixed on the vessel's floor. Eccentric mass 762 provides rotation to generator 767 which is fixed on an elevated structural element or table 766, fixed on the vessel floor. Eccentric mass 762 rotates at a plane higher than that of eccentric mass 752 so that both can rotate in a full circle rotation without colliding on each other. Also, the shafts are placed at a distance from each other so that the rotating masses do not collide on them while rotating in a full circle.

Eccentric masses 752 and 762 are entirely enclosed for rotation by vessel roof 750. Shafts 755 and 765 are upwardly extended and fixed on roof 750 at points 758 and 768 respectively.

The external surface of roof 750 securely supports solar photovoltaic cells or PV panels with cells, such as photovoltaic cells 770, 771, 772, 773. These cells generate electricity when they are exposed to the daylight while the vessel floats. The electricity produced by the cells is stored via cable 774 to battery 775, which is securely fixed inside the vessel. This electricity can be used for the electrical power needs of the control system or for providing power to the grid via the turbine's underwater cable.

FIG. 20 shows the vessel tied on the side of mooring support 723, that is the more elastic side's mooring support, with mooring line 722, which may include a spring part 745, implementing the elastic side mooring means. The stiffer side's mooring support 721 is tied with a mooring line 744 in addition to line 724, for restraining better the vessel on that side and implementing the stiffer side mooring means. The stiffer side mooring means provide stiffer overall mooring than the elastic side mooring means. Elastic mooring lines with spring components are commercially available from companies such as TFI Marine, 6 Charlemont Terrace, Crofton Road, Dún Laoghaire, Dublin, A96 F8W5, Ireland.

Other preferred embodiments utilize alternative mooring configurations, such as multiple lines in each side which can be of different materials such as steel, nylon etc., however, the overall mooring stiffness provided to the one side mooring support is different from the overall stiffness provided to the opposite side mooring support.

A preferred embodiment uses identical eccentric masses. Another preferred embodiment uses non identical eccentric masses. Yet another embodiment includes a plurality of shafts, that is more than one or two shafts, and corresponding masses for rotation, all in one vessel.

The turbine of FIG. 20 is utilized to convert renewable wave and solar energy into electrical power. As each renewable source is intermittent having periods of zero production, but not at the same time necessarily, the aggregate power output variability of both sources combined is lower than each output of each source separately, thus providing an combined electrical power output waveform smoother and with less interruptions, which is very useful for powering devices and applications with electricity.

Figure 21:
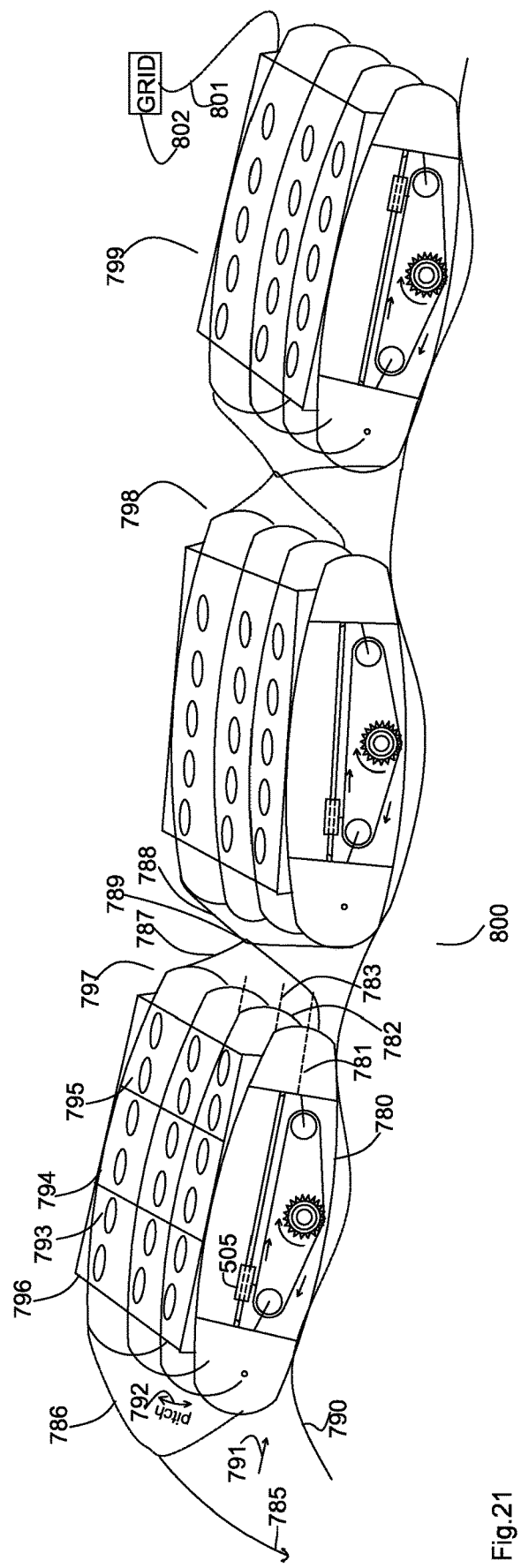
FIG. 21 shows a floating wave and solar energy conversion power production plant.

An additional preferred embodiment combining renewable wave and solar energy conversion is the electrical power production plant 800 shown in FIG. 21. Each tube of plant 800 utilizes the turbine with the reciprocating mass and corresponding mechanism within the vessel shown in FIG. 17. FIG. 21 shows a reciprocating mass, such as mass 505, and a corresponding mechanism entirely enclosed in each tube, such as tubes 780 and 782.

Each tube is disposed on waves 790 with an oncoming wave direction 791. Each tube has a corresponding longitudinal axis, such as axes 781 and 783 for tubes 780 and 782 respectively, substantially parallel to the oncoming wave direction 791. Each mass in each tube, reciprocates on a guide rail parallel to the tube's longitudinal axis, due to the mass's weight during the pitch motion of the waves. A plurality of tubes each containing a corresponding reciprocating mass, a reciprocating mass mechanism and a generator, is fixed and aligned in parallel to each other forming a group of parallel fixed tubes. This creates a large floating area, on top of the group of tubes, for installation of an electrical grid-scale power production floating solar park. That is, the wave energy converting tubes create an area for a solar park installation, as well. The wave energy source captured by each tube's pitch motion is converted to electricity by the electrical generator enclosed in each tube. The aggregate output of the power produced by each generator can amount to a grid-scale production, as well. Placing a plurality of tubes fixed to each other is feasible and power density advantageous as each mass reciprocates longitudinally when producing electrical power, thus providing the suitability of placing many tubes fixed in parallel. Furthermore, manufacturing-wise this wave-solar park is of low cost, as tubes, such as steel tubes, are commercially available through continuous manufacturing processes, which lowers the resulting levelized cost of energy (LCOE) of the plant and which in turn increases the feasibility of commercialization of the so far not exploitable ocean wave energy.

Batteries, fixed inside each tube can be used for electrical power storage. The power produced is provided to the grid via underwater cable 801.

In addition, FIG. 21 shows a plurality of groups of tubes, such as tube groups 797, 798 and 799, tied to each other in succession and disposed for a pitching motion, when floating on the waves. The area on top of each group of the fixed together parallel tubes holds fixed solar photovoltaic (PV) panels with cells. FIG. 21 shows solar cells, such as cells 793, 794, 795 installed on solar panels, such as PV panel 796. A plurality of panels on each group of tubes forms a solar park. The plurality of the tube groups is disposed for a pitching motion on the ocean waves 790 with oncoming direction 791. Each tube of each group, such group 797, pitches as shown by arrows 792. Each reciprocating mass, such as mass 505 inside each tube of each tube group, reciprocates according to the waves pitch motion causing the rotation of the rotor shaft of an electricity producing generator, as it was shown in FIG. 17.

Furthermore, FIG. 21 shows that the plurality of each tube group is tied in succession through joints such as joint 789, with joint arms and cardan joints or ropes, such as ropes 787 and 788. The plurality of the tube groups is moored in the ocean with mooring lines 785 and 786, as shown in FIG. 21, which keeps plant 800 moored with the tubes' longitudinal axes substantially aligned with the direction of the oncoming waves.

A plant, such as plant 800, can provide a substantial electrical energy to the grid. Farms of such plants in collocation with offshore wind farms can solve the baseload clean power production for all humanity needs forever.

While preferred embodiments of the present invention have been shown and described, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

The invention claimed is:

1. A turbine comprising:
   an upwards shaft;
   a mass eccentrically and bearing mounted for rotation about said shaft on a rotational plane perpendicular to said shaft, said mass having a center of gravity at a distance from said shaft;
   a floating vessel having a floor and a roof, being in communication with ocean waves having a wave direction, said shaft being fixed inside said vessel;
   said mass being disposed to gravitational forces causing said rotation when said vessel being in communication with said ocean waves;
   said roof entirely enclosing said shaft and said mass for protection from ocean water;
   an asymmetric vessel mooring means for promoting said rotation comprising a stiffer side mooring support fixed on said vessel and an elastic side mooring support fixed on said vessel, wherein said stiffer side mooring support and said elastic side mooring support are arranged on a line, said line being aligned substantially perpendicularly to said wave direction; and
   a stiffer side mooring means with a stiffer side mooring stiffness tying on said stiffer side mooring support and an elastic side mooring means with an elastic side mooring stiffness tying on said elastic side mooring support, for allowing a limited yaw and a reciprocating surge-swing motion of said vessel when said vessel is disposed on said ocean wave direction, said stiffer side mooring stiffness being different from said elastic side mooring stiffness, said mass having an angular velocity, whereby said limited yaw and said reciprocating surge-swing motion of said vessel caused by said waves and said asymmetric vessel mooring means is transferred to said fixed shaft promoting said mass rotation.

2. The turbine of claim 1 wherein:

said stiffer side mooring means is at least one stiff mooring line with a stiffer side anchor anchoring on the seabed and said elastic side mooring means is at least one elastic mooring line with a spring and an elastic side anchor anchoring on the seabed.

3. The turbine of claim 1 further including:

solar energy to electricity converting photovoltaic cells fixed on said roof.

4. The turbine of claim 1 further including:

an electrical generator having a rotor in rotational communication with said mass and a stator fixed in said vessel.

5. The turbine of claim 1 further including:

a control means for maintaining said mass angular velocity at a minimum predetermined value by constantly monitoring electronically said mass angular velocity.

6. A turbine comprising:

a plurality of upwards shafts each having a corresponding longitudinal axis and a corresponding mass eccentrically and bearing mounted for collision-free full circle rotations, said corresponding mass having a center of gravity at a distance from said corresponding shaft longitudinal axis;

a floating vessel having a floor and a roof, being in communication with ocean waves having a wave direction, said plurality of upwards shafts being fixed inside said vessel; said corresponding mass being disposed to gravitational forces causing said rotations when said vessel being in communication with said ocean waves, said roof entirely enclosing said plurality of shafts and masses for protection from ocean water;

an asymmetric vessel mooring means for promoting said rotation comprising a stiffer side mooring support fixed on said vessel and an elastic side mooring support fixed on said vessel, wherein said stiffer side mooring support and said elastic side mooring support are arranged on a line, said line being aligned substantially perpendicularly to said wave direction; and a stiffer side mooring means with a stiffer side mooring stiffness tying on said stiffer side mooring support and an elastic side mooring means with an elastic side mooring stiffness tying on said elastic side mooring support, for allowing a limited yaw and a reciprocating surge-swing motion of said vessel when said vessel is disposed on said ocean wave direction, said stiffer side mooring stiffness being different from said elastic side mooring stiffness, said corresponding mass having an angular velocity;

whereby said limited yaw and said reciprocating surge-swing motion of said vessel caused by said waves and said asymmetric vessel mooring means is transferred to said plurality of fixed shafts promoting said corresponding mass rotation.

7. The turbine of claim 6 wherein:

said stiffer side mooring means is at least one stiff mooring line with a stiffer side anchor anchoring on the seabed and said elastic side mooring means is at least one elastic mooring line with a spring and an elastic side anchor anchoring on the seabed.

8. The turbine of claim 6 further including:

solar energy to electricity converting photovoltaic cells fixed on said roof.

9. The turbine of claim 6 further including:

a plurality of electrical generators each being in rotational communication with said corresponding mass and having a stator fixed in said vessel.

10. The turbine of claim 6 further including:

a control means for maintaining said corresponding mass angular velocity at a minimum predetermined value by constantly monitoring electronically said corresponding mass angular velocity.

* * * * *